United States Patent [19]
Ohki et al.

[11] Patent Number: 6,000,607
[45] Date of Patent: Dec. 14, 1999

[54] IC CARD READER/WRITER AND METHOD OF OPERATION THEREOF

[75] Inventors: Masayuki Ohki; Atsuhiko Urushihara; Jun Furuya, all of Kokubunji; Shigeyuki Itoh, Kawasaki; Hiroki Kitagawa, Tokyo; Takao Oosawa, Niiza, all of Japan

[73] Assignee: Hitachi, Ltd., Tokyo, Japan

[21] Appl. No.: 08/758,817

[22] Filed: Dec. 4, 1996

[30] Foreign Application Priority Data

Dec. 8, 1995 [JP] Japan ................................ 7-320632

[51] Int. Cl.⁶ ..................................................... G06F 3/00
[52] U.S. Cl. .......................... 235/379; 235/380; 235/441
[58] Field of Search .................................. 235/379, 380, 235/441

[56] References Cited

U.S. PATENT DOCUMENTS

| | | | |
|---|---|---|---|
| 4,277,837 | 7/1981 | Stuckert | 235/379 |
| 4,719,338 | 1/1988 | Avery et al. | 235/379 |
| 4,839,504 | 6/1989 | Nakano | 235/379 |
| 4,900,906 | 2/1990 | Pusic | 235/381 |
| 5,237,327 | 8/1993 | Saitoh et al. | 341/176 |
| 5,369,700 | 11/1994 | Koura et al. | 379/387 |
| 5,426,285 | 6/1995 | Sherrod | 235/449 |
| 5,440,502 | 8/1995 | Register | 364/708.1 |
| 5,517,569 | 5/1996 | Clark | 380/52 |
| 5,541,985 | 7/1996 | Ishii et al. | 379/111 |
| 5,623,547 | 4/1997 | Jones et al. | 235/379 |
| 5,739,515 | 4/1998 | Takemura | 235/441 |

FOREIGN PATENT DOCUMENTS

| | | |
|---|---|---|
| 0256768 | 2/1988 | European Pat. Off. . |
| 0426163 | 5/1991 | European Pat. Off. . |
| 0619564 | 10/1994 | European Pat. Off. . |
| 716534 | 12/1996 | European Pat. Off. . |
| 62-229385 | 10/1987 | Japan . |
| 63-298680 | 12/1988 | Japan . |
| 7-192102 | 7/1995 | Japan . |
| 2304220 | 3/1997 | United Kingdom . |
| 2306241 | 4/1997 | United Kingdom . |
| 93/02430 | 2/1993 | WIPO . |
| WO94/19777 | 9/1994 | WIPO . |

OTHER PUBLICATIONS

Mondex Magazine, launch issue.

*Primary Examiner*—Donald Hajec
*Assistant Examiner*—Drew A. Dunn
*Attorney, Agent, or Firm*—Fay, Sharpe, Beall, Fagan, Minnich & McKee

[57] ABSTRACT

An IC card reader/writer having a body which includes an IC insertion slot and an operation display section. The body is separable into an upper cover and a lower portion. The upper cover and the lower portion are displaced from each other to form a step on the side of the body formed with the IC card insertion slot. A recessed portion recessed from the step is formed on the portion of the body having the IC card insertion slot. The surface of the upper cover is curved upwardly in a direction away from the IC card insertion slot in such a manner as to increase the thickness progressively toward the side of the body far from the IC card insertion slot, and a display section is located on the slope of the curved portion. The operating area of the IC card reader/writer is provided with function keys.

14 Claims, 15 Drawing Sheets

IC CARD READER/WRITER AND METHOD OF OPERATION THEREOF

BACKGROUND OF THE INVENTION

The present invention relates to an IC card reader/writer and a method of operation thereof for interfacing between an IC card used for an electronic money system and various conventional equipment such as POS terminals and banking teller terminals, and more particularly to an IC card reader/writer and a method of operation thereof suitably used for interfacing each of IC cards containing electronic money and conventional equipment in the case where electronic money transactions are made between the IC cards.

In recent years, an electronic money system has been suggested in which electronic money is exchanged by communication between IC cards containing electronic money. The IC card used for this system includes a microprocessor having a communication function and a memory such as EEPROM for storing a processing program and the balance of electronic money. Electronic money can be transferred between IC cards by means of an electronic money system through which terminals installed in banks, retail or other stores and residences of individuals or stand-alone terminals are arbitrarily connectable through a public telephone line.

In the electronic money system described above, however, the functions and hardware to constitute the system have not yet been defined.

SUMMARY OF THE INVENTION

The object of the present invention is to provide an IC card reader/writer and a method of operation thereof suitably used with the above-mentioned electronic money system configured of conventional various equipment such as personal computers, telephones, POS terminals or information/communication systems for interfacing between these equipment and IC cards transacting with each other.

According to a first aspect of the present invention, there is provided an IC card reader/writer for interfacing between an IC card including a built-in integrated circuit capable of writing and reading at least digital information and containing electronic money on the one hand and information equipment such as a banking teller terminal, a POS terminal, a personal computer or a telephone on the other hand, wherein the body of the IC card reader/writer includes at least an IC card insertion slot, an upper cover and a lower portion separable from each other, raised portions formed by the upper cover and the lower portion displaced from each other in the body portion formed with the IC card insertion slot and a rack recessed from the raised portions of the IC card insertion slot.

According to a second aspect of the invention, there is provided an IC card reader/writer comprising a keyboard having ten-keys and function keys and a display section on the surface of the upper cover of the body, wherein the surface of the upper cover is curved upward in the direction away from the IC card insertion slot in such a manner as to increase the thickness of the IC card reader/writer progressively toward the body portion thereof far from the IC card insertion slot, and the display section is arranged on the slope of the curved portion.

According to a third aspect of the invention, there is provided an IC card reader/writer comprising a keyboard including ten-keys and function keys and a display section arranged on the upper surface thereof.

According to a fourth aspect of the invention, there is provided an IC card reader/writer comprising a body including an IC card insertion slot, an upper cover and a lower portion separable from each other, raised portions formed by the upper cover and the lower portion displaced from each other in the body portion having the IC card insertion slot, a rack recessed from the raised portions of the IC card insertion slot, and a keyboard having ten-keys and function keys arranged on the surface of the upper cover, and a display section arranged on the surface of the upper cover, the function keys including a key for displaying the balance of electronic money contained in the IC card or a key for checking whether or not the IC card containing the electronic money is locked.

According to a fifth aspect of the invention, there is provided a method of operating an IC card reader/writer comprising the steps of causing the user to insert an IC card into a card insertion slot of the IC card reader/writer, causing the user to instruct the balance of electronic money contained in the IC card to be displayed, and displaying the balance of the electronic current contained in the IC card.

According to a sixth aspect of the invention, there is provided a method of operating an IC card reader/writer comprising the steps of causing the user to insert an IC card into a card insertion slot of the IC card reader/writer, causing the user to instruct the IC card reader/writer to display whether or not the IC card is locked, and displaying whether or not the IC card is locked.

According to a seventh aspect of the invention, there is provided a method of operating an IC card reader/writer comprising the steps of causing the user to insert an IC card into an IC card insertion slot of the IC card reader/writer, causing the user to specify another IC card with which the user intends to transact by electronic money, causing the user to enter a transaction amount of electronic money and displaying the transaction amount.

According to an eighth aspect of the invention, there is provided a method of operating an IC card reader/writer comprising the steps of causing the user to insert an IC card into an IC card insertion slot of the IC card reader/writer, causing the user to select the desired one of a plurality of electronic currencies contained in the IC card, and displaying the selected desired currency.

According to a ninth aspect of the invention, there is provided a method of operating an IC card reader/writer comprising the steps of causing the user to insert an IC card into an IC card insertion slot of the IC card reader/writer, causing the user to instruct the transaction record of the IC card to be displayed, and displaying the transaction record of the IC card.

DESCRIPTION OF THE PREFERRED EMBODIMENTS

An IC card reader/writer for an electronic money system according to embodiments of the invention will be explained below with reference to the accompanying drawings.

Figure 1:
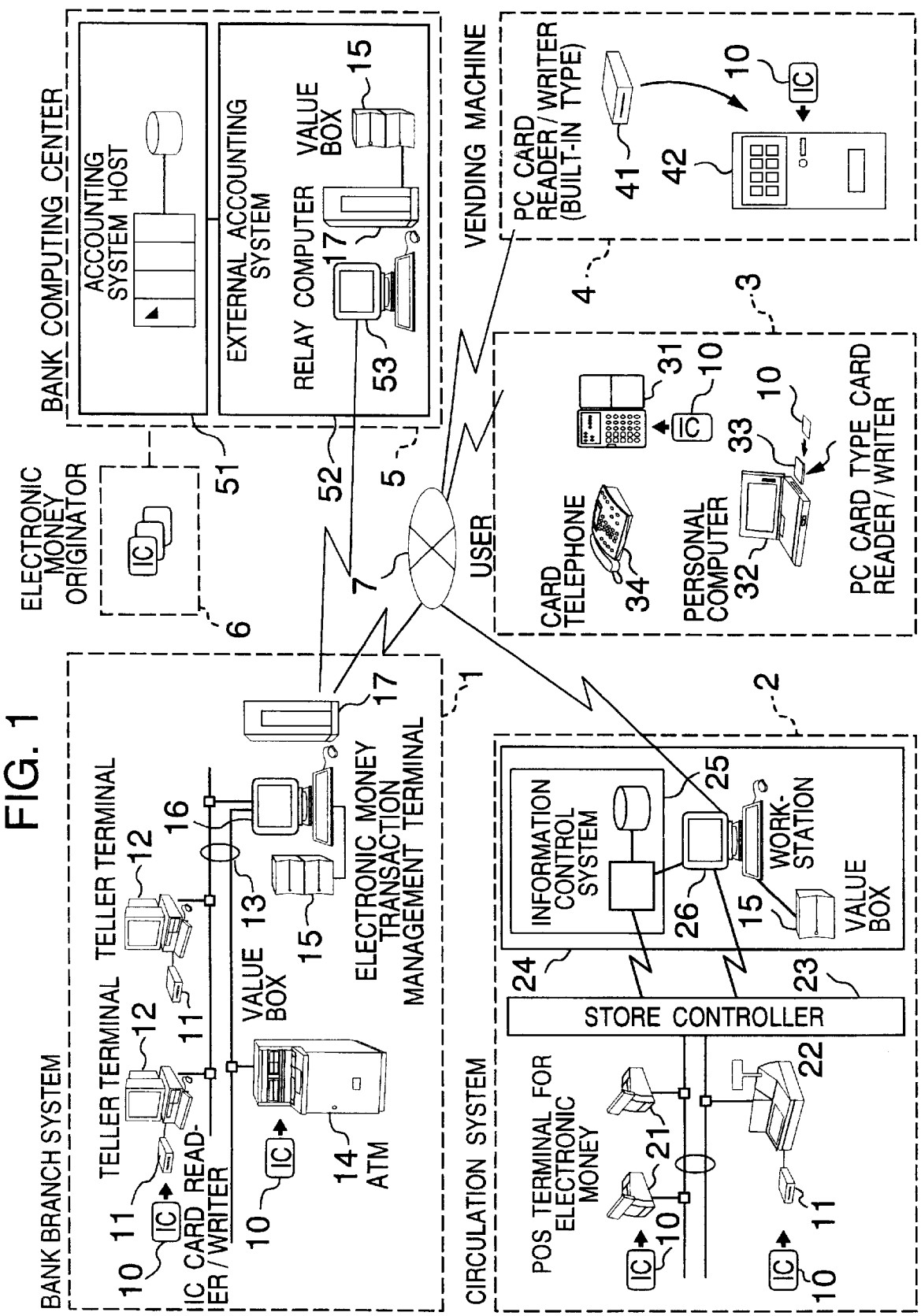
FIG. 1 is a block diagram showing a configuration of an electronic money system using an IC card reader/writer according to the present invention.

FIG. 1 is a block diagram showing a configuration of an electronic money system using an IC card reader/writer according to the invention. First, the configuration of an electronic money system will be explained with reference to FIG. 1. In FIG. 1, reference numeral 1 designates a bank branch system, numeral 2 a retail store system, numeral 3 a public user system, numeral 4 a vending machine system, numeral 5 a bank computing center, numeral 6 an electronic money originator, numeral 7 a public telephone line, numeral 10 IC cards, numeral 11 external IC card reader/writers, numeral 12 banking teller terminals, numeral 13 an internal communication line, numeral 14 an automatic teller machine (ATM), numeral 15 value boxes, numeral 16 an electronic money transaction management terminal, numeral 17 relay computers, numeral 21 POS terminals for electronic money, numeral 22 a POS terminal, numeral 23 a store controller, numeral 24 a center device, numeral 25 a value control and management system, numeral 26 a work station, numeral 31 an electronic wallet, numeral 32 a personal computer, numeral 33 a PC card reader/writer, numeral 34 an IC card telephone, numeral 41 an IC card reader/writer, numeral 42 a vending machine, numeral 51 an accounting system host, numeral 52 an external accounting system, and numeral 53 an external management terminal.

The electronic money system shown in FIG. 1 includes a bank branch system 1, a retail store system 2 installed in large retail stores such as department stores or supermarkets, a personal computer 32 constituting a public user system 3 and an IC card telephone 34 connected each other by a public telephone line network 7, and also a vending machine system 4 or the like not connected to the public telephone network 7. The shown case includes one example of each of several representative systems. A multiplicity of each of the systems can alternatively be configured by being connected to the public telephone line 7. The bank branch system is connected to a bank computing center 5 through a private line, and the bank computing center 5 is connected to an electronic money originator 6.

The IC card 10 includes a microprocessor having a communication function built therein, and an EEPROM or the like memory for storing a processing program and the balance of electronic money. The IC card 10 is held by an individual and at the same time by a bank, a retail store, a vending machine or the like participating in the electronic money system.

The bank branch system 1, as well known, includes banking teller terminals 12 and an automatic teller machine 14 connected through an internal communication line 13 and is also connected to a bank computing center through a relay computer 17. For the purpose of electronic money transactions, the automatic teller machine 14 has an IC card reader/writer built therein, and a value box 15 connected through a transaction management terminal 16 for electronic money.

The bank computing center 5 includes an accounting system host 51 and an external accounting system 52. The external accounting system 52 in turn includes an external management terminal 53, a relay computer 17 and a value box 15.

The retail store system 2 normally includes at least a POS terminal connected through an internal communication line 13 and a store controller 23 to a center device 24. For the purpose of electronic money transactions, an ordinary POS terminal 22 includes an external IC card reader/writer 11, or the POS terminals 21. The center device 24 includes a value control and management system 25, a work station 26 and a value box 15.

The public user system 3 is primarily an individual user system, and may include only an electronic wallet capable of displaying the balance of electronic money in its simple form. The electronic wallet 31 may have the added function of a hand-held calculator or the like. The personal computer 32 is held by an individual and includes a PC-type card reader/writer 33 that can be connected to the public telephone network 7 for electronic money transactions. It is also possible to use an IC card telephone which is an ordinary telephone having the function of processing the IC card 10 containing electronic money.

The personal computer 32 or the IC card telephone 34 of the public user system 3 described above may include two card reader/writers for two IC cards contained therein to permit electronic money transactions between the two IC cards. With such a system, the electronic money held by a husband in an IC card, for example, may be transferred to the IC card of his wife or other transactions can be performed similarly to ordinary cash transactions.

The vending machine system 4 includes a vending machine 42 having a built-in IC card reader/writer 41.

Now, explanation will be made about a method of using an electronic money system according to the present invention configured as described above.

The IC cards 10 are distributed from the originator 6 to the banks, the retail stores, the vending machines, the individuals and the like participating in the system. Also, each bank receives the electronic money in exchange for the cash of an ordinary currency and stores it in the value box 15 installed in the external accounting system 52. The value box 15 contains a multiplicity of IC cards 10, each of which contains the electronic money distributed and received from the originator. The electronic money contained in the IC cards in the value box 15 of the external accounting system 52 is distributed to the IC cards 10 in the value box 15 of the bank branch system 1 installed in each bank branch.

Each individual participating as an end user in the electronic money system holds the IC card distributed to him, and can withdraw the money deposited in his account maintained in a bank by exchanging it with electronic money through the banking teller machine 12 and the auto teller machine 14 of the bank branch system 1, and adds it to the contents of his IC card 10. Alternatively, he connects the personal computer 32 having a PC card reader/writer 33 or the IC card telephone 34 to the bank branch system 1 through the public telephone line 7 to withdraw the money from his bank account by exchanging it with electronic money and adds it to the contents of his IC card in the same manner as the way described above.

When electronic money is withdrawn, the IC card held by an individual is connected to the IC card in the value box 15 of the bank branch system 1 through the banking teller terminal 12, the automatic teller machine 14, the personal computer 32 or the IC card reader/writer of the IC card telephone 34 by means of the communication function of the IC card of the particular individual. Under the control of the electronic money transaction management terminal 16, the electronic money contained in the IC card 10 stored in the value box 15 of the bank branch system 1 is transferred to the IC card held by the individual. In the process, the balance of electronic money contained in the IC card 10 in the value box 15 of the bank branch system 1 is reduced by the amount transferred to the IC card 10 held by the individual. Also, the money deposited in the banking account of an individual can be withdrawn in the same way as in the conventional method.

In the above-mentioned case, the money deposited in the bank account of an individual is withdrawn and transferred to the IC card held by that individual. Instead, cash may be brought to the window of a bank or the originator to transfer a given amount of money to the IC card.

Conversely, the electronic money in an IC card can be returned to an IC card in the value box 15 of the bank branch system 1 through the banking teller terminal 12, the auto teller machine 14 and the personal computer 32, while at the same time being deposited in the account of the individual owning the IC card.

As described above, the user having electronic money contained in his IC card 10 can purchase commodities or otherwise receive various services from various retail stores by using the IC card 10 in the same manner as cash.

Now, assume that the user having electronic money contained in his IC card 10 visits a retail store and has brought in a purchased commodity to the POS terminal counter for transaction. The POS terminal operator has the bar code read in the same way as in ordinary transactions and thus enters the price of the commodity by way of the POS terminal 21 or 22, and thus calculates and bills the total amount to the customer.

In the case where the customer pays electronic money in place of cash by means of the IC card containing the electronic money, on the other hand, he inserts the IC card in the card insertion slot of the electronic money POS terminal 12 or in the IC card reader/writer 11 connected to an ordinary POS terminal 22. The IC card of the customer is then connected to an IC card in the value box 15 installed in the center device 24 of the store through the internal communication line 13 and the work station 26. The electronic money in the customer's IC card is transferred to the IC card in the value box 15 installed in the center device 24, with the result that a receipt is issued from the POS terminal to complete the transaction. At the same time, the electronic money in the customer's IC card is reduced and added to the electronic money of the store's IC card by the amount of the commodity purchased.

The above-mentioned retail store system includes a multiplicity of POS terminals and a center device 24 including a value box having a multiplicity of IC cards for commodity transactions. In the case of a system including only one deposit terminal or the like such as one used by pop-and-mom or other small retail stores, however, the deposit terminal may include an IC card reader/writer containing IC cards for customers and at the same time contain the IC card held by the particular shop for electronic money transfer between the store's IC card and a customer's IC card connected through the IC card reader/writer. The electronic money in the retail store's IC card can be deposited in the store's bank account or encashed at the bank teller's window.

Further, the above-mentioned retail store system having POS terminals may be configured in such a manner that each POS terminal has an IC card and money is transferred between the particular IC card and the customer's IC card and then from the POS terminal to the IC card in the value box of the center device 24, as required.

In the case where the vending machine 42 or the like takes part in the electronic money system, on the other hand, the vending machine 42 includes an IC card reader/writer 41 built therein and contains its own IC card at the same time, so that money may be transferred between the particular IC card and the customer's IC card inserted in the IC card reader/writer 41.

Now, an IC card reader/writer used for the electronic money system used in the above-mentioned manner according to an embodiment of the invention will be explained with reference to the drawings.

Figure 2:
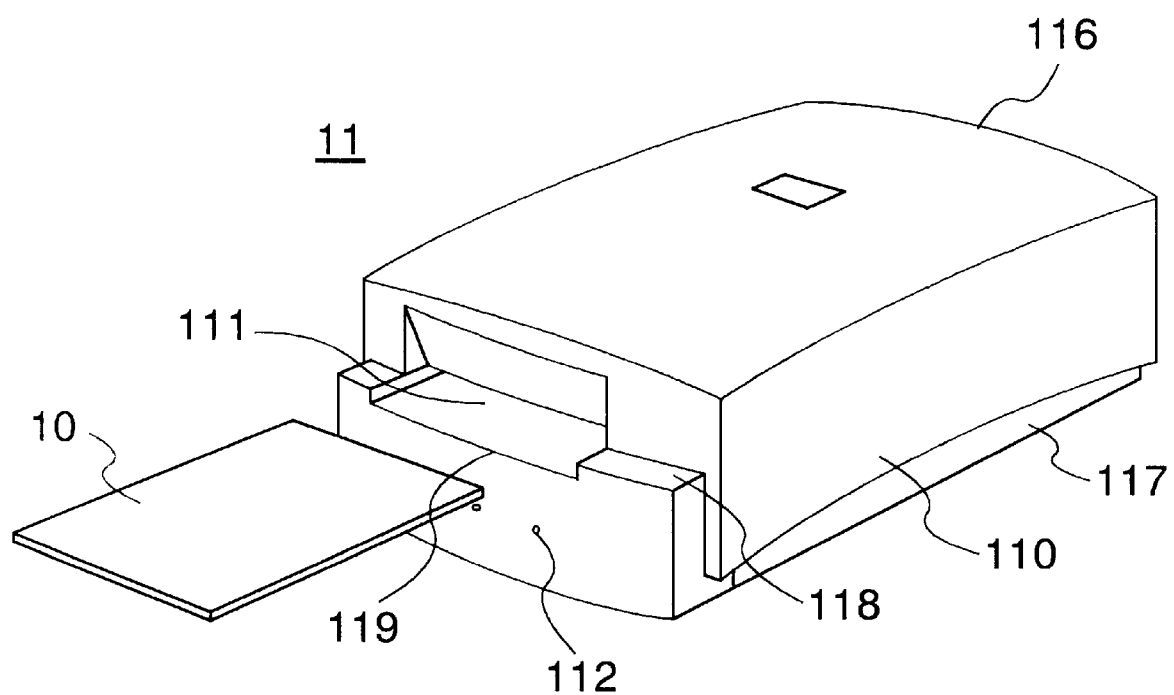
FIG. 2 is a perspective view showing an external appearance of an IC card reader/writer according to the first embodiment of the invention.

FIG. 2 is a perspective view showing an external appearance of an IC card reader/writer according to a first embodiment of the invention. In FIG. 2, numeral 110 designates a body, numeral 111 an IC card insertion slot, numeral 112 an operation display section, numeral 116 an upper cover, numeral 117 a lower portion, numeral 118 raised portions making up steps, and numeral 119 a rack or a platform. The remaining reference numerals designate similar component parts to the corresponding parts in FIG. 1, respectively.

The IC card reader/writer 11 according to the first embodiment of the invention includes the body 110 including the IC card insertion slot 111 and the operation display section 112, as shown in FIG. 2. The body 110 is configured of the upper cover 116 and the lower portion 117. The portion of the body 110 having the IC card insertion slot 111 is formed with steps with the upper cover 116 and the lower portion 117 displaced from each other. Further, the portion of the body having the IC card insertion slot 111 is formed with the rack 119 recessed from the steps 118. The upper cover 116 and the lower portion 117 of the body 110 are coupled to each other by such means as screws from the bottom of the lower portion 117. The upper cover 116 thus can be separated from the lower portion 117.

With this configuration, the IC card 10 can be inserted into the IC card insertion slot 111 along the rack 119. The IC card can thus be easily and securely inserted without the fear of dropping. Even an optically-handicapped person attempting to insert his IC card can identify the rack 119 and insert the IC card easily and accurately simply by touching the IC card insertion slot by hand.

Further, since the body 110 includes the upper cover 116 and the lower portion 117 separable from each other, the function circuits contained in the body can be exposed to facilitate maintenance thereof.

The IC card reader/writer according to this embodiment can be connected to the banking teller terminals 12 of a bank branch system or to a POS terminal 22 of a retail store system, as shown in FIG. 1. It can also be connected to a personal computer or a normal telephone.

The IC card reader/writer 11 shown is connected to the banking teller terminals 12 of a bank branch system or the POS terminal 22 of a retail store system or to information systems such as a personal computer or a normal telephone equipment by means of a connection line or the like not shown. In this way, the IC card reader/writer 11 is used by inserting the IC card 10 containing the electronic money explained with reference to FIG. 1 into the IC card insertion slot 111. The IC card 10 contains data such as electronic money, transaction record and personal information. The IC card reader/writer 11 interfaces between the equipment connected therewith and the IC card 10.

In the case where the IC card reader/writer 11 is connected to a banking teller terminal 12 of a bank branch system, the bank customer inserts his IC card 10 containing electronic money into the IC card insertion slot 111 and requests the teller to process his transaction. Electronic money in the IC card can thus be deposited in or withdrawn from his account, exchanged with cash, transferred to the account of another person, or otherwise can be processed.

In the case where the IC card reader/writer 11 is connected to the POS terminal 22 of a retail store system, on the other hand, the customer inserts his IC card 10 containing electronic money into the IC card insertion slot 111 and can pay the purchase price by electronic money contained in the IC card 10. In the case where the IC card reader/writer 11 is connected to an ordinary telephone, electronic money can be transferred between his IC card and the IC card of the other party connected by the communication function of the telephone. In this way, electronic money can be processed the same way as in the above-mentioned case in which the other party is a bank branch system.

Furthermore, assume that the IC card reader/writer 11 is connected to a personal computer. The transaction record, personal information and other data contained in the IC card can be processed in the personal computer. The balance of electronic money can also be read out and referred to. Also, a personal computer having a communication function can perform transactions in electronic money with the IC cards set in the terminals of other personal computers, bank terminals or retail stores connected through a public telephone line. In addition, in the case where two card readers/ writers 11 are connected to a personal computer with an IC card inserted in each of them, electronic money transaction can be performed between the two IC cards.

Figure 3:
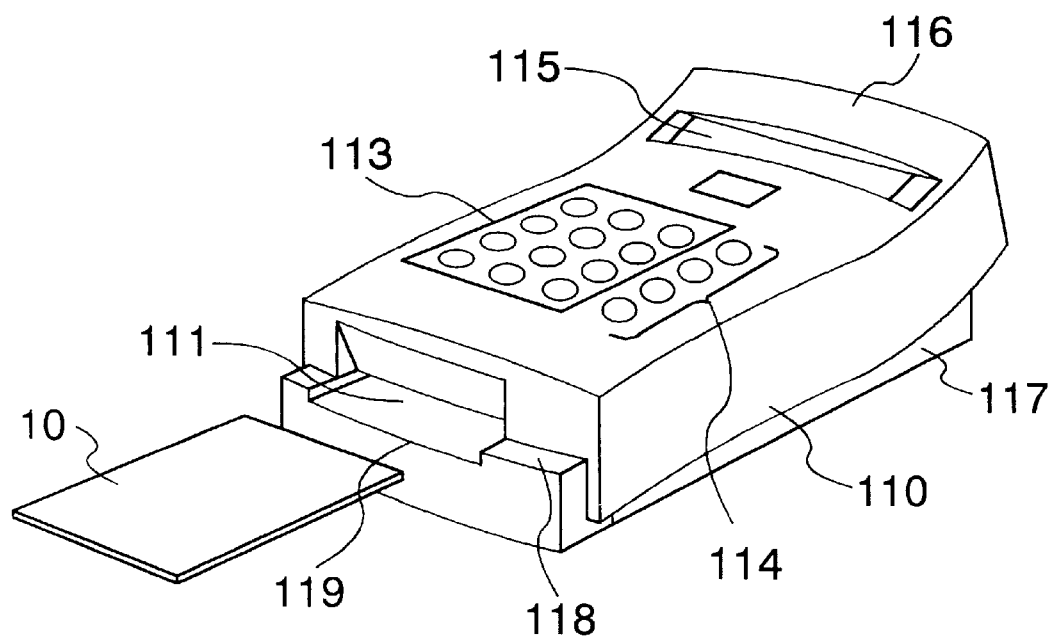
FIG. 3 is a perspective view showing an external appearance of an IC card reader/writer according to a second embodiment of the invention.

FIG. 3 is a perspective view showing an external appearance of an IC card reader/writer according to a second embodiment of the invention. In FIG. 3, numeral 113 designates ten-keys, numeral 114 function keys, and numeral 115 a display section. The other reference numerals designate the same component parts as the corresponding parts in FIG. 2, respectively.

The IC card reader/writer 11 according to the second embodiment of the invention comprises the ten-keys 113, the function keys 114 and the display section 115 added to the IC card reader/writer 11 shown in FIG. 2.

According to the second embodiment, the surface of the upper cover 116 is curved upward in the direction away from the IC card insertion slot in such a manner as to increase the thickness of the IC card reader/writer progressively toward the side thereof far from the IC card insertion slot, and the display section 115 is located on the slope of the curved portion. The other portions of the card reader/writer 11 are configured the same way as in the case of FIG. 2. As a result, the second embodiment has the same effect as the embodiment shown in FIG. 2, and data on the display section are easily visible from the side of the card reader/writer 11 having the IC card insertion slot.

The IC card reader/writer shown in FIG. 3 includes the ten-keys 113, the function keys 114 and the display section 115, which can be used for unlocking the IC card and displaying the balance and the billed amount when the IC card reader/writer is connected to a POS terminal.

More specifically, the IC card 10 containing electronic money, though it can be used in the same way as ordinary money, is held by individuals or retail stores. If the IC card 10 is lost, therefore, it may be illegally used by other persons. In order to prevent this illegal use, the IC cards held by individuals or retail stores can be locked by assigning a password to each of them. When the IC card is used, especially, when it is used for payment by electronic money, therefore, some unlocking means is necessary to make it possible to process the electronic money by entering the password.

The second embodiment of the invention having such an unlocking function will be explained below.

First, an IC card is inserted into the IC card insertion slot 111. The internal circuit of the IC card reader/writer checks the state of the IC card and displays on the display section 115 such guide words as "LOCKED". Then, the user depresses the LOCK/UNLOCK key included in the function keys. The display section 115 displays such guide words as "ENTER YOUR PASSWORD". The user enters his password according to the guide. The internal circuit unlocks the IC card and displays such wording as "YOUR IC CARD IS UNLOCKED", thus completing the unlocking operation.

Now, explanation will be made about the case in which the IC card reader/writer is used by being connected to a POS terminal 22. In this case, the IC card is assumed to be in unlocked state.

When the customer brings in commodities onto a POS counter in a supermarket or the like, the clerk has the POS terminal 22 read the bar codes of the commodities or otherwise display the total price of the purchased commodities on the display section 115 of the IC card reader/writer. The customer inserts his IC card into the IC card insertion slot 111. The internal circuit of the IC card reader/writer and the POS terminal then withdraw the electronic money in an amount equivalent to the billed price from the IC card and transfers it to the store's IC card in the POS terminal. In this way, the transaction for commodity purchase is completed, and the customer can receive his IC card delivered from the IC card reader/writer together with the commodities.

Explanation will be made below about a case in which the balance of electronic money in an IC card is referred to using the IC card reader/writer.

The IC card is inserted into the IC card insertion slot 111 and the BALANCE key included in the function keys 114 is depressed. The internal circuit of the IC card reader/writer reads the balance of electronic money from the IC card and displays it on the display section 115. The balance is on display only as long as the BALANCE key is depressed.

The various functions using the ten-keys, the function keys 114 and the display section 115 were described above. The IC card reader/writer shown in FIG. 3 can also be used in the same manner as the one described with reference to FIG. 2.

Now, the configuration of internal functions of the IC card reader/writer according to this invention will be explained with reference to the accompanying drawings.

Figure 4:
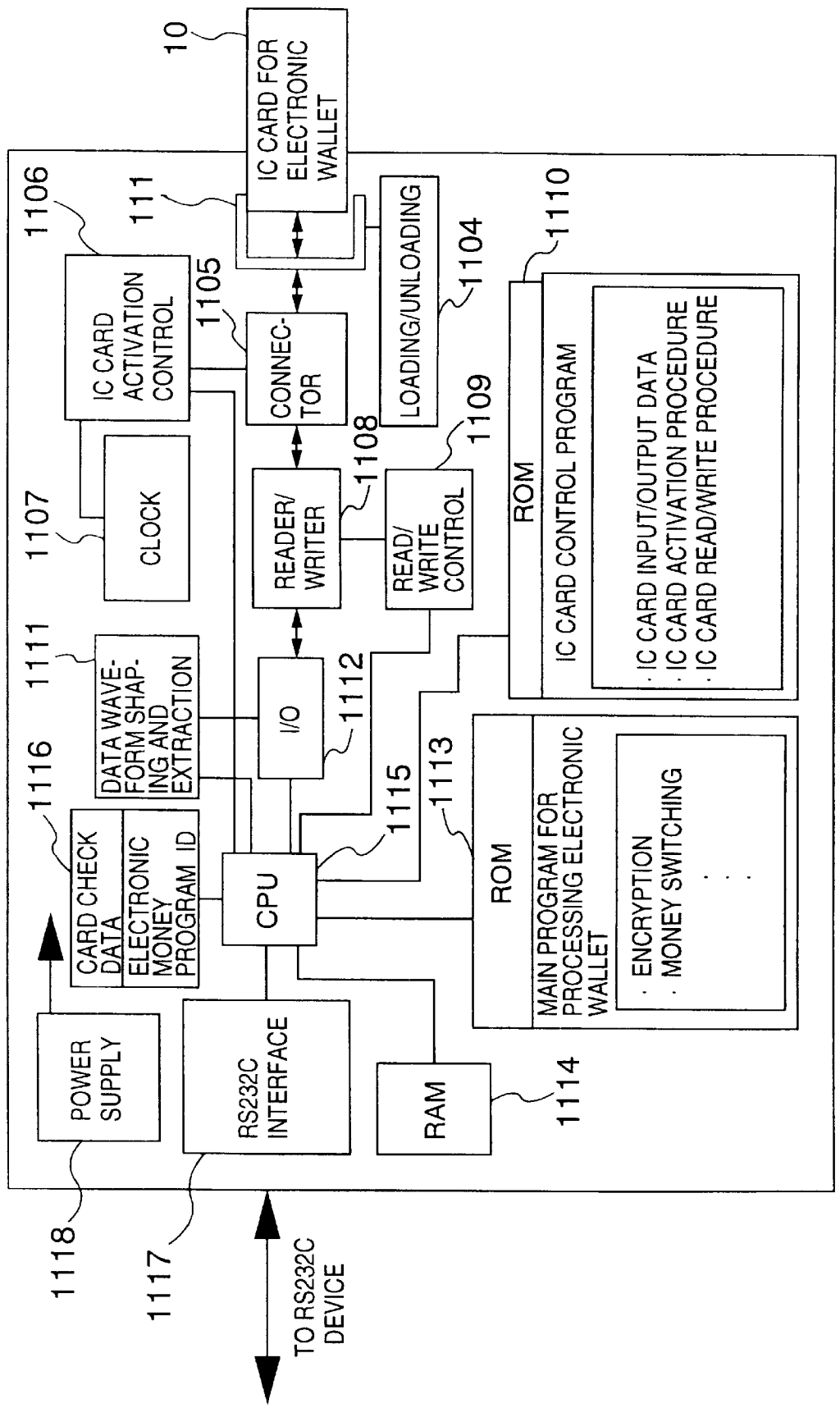
FIG. 4 is a block diagram showing a configuration of an IC card reader/writer having an electronic wallet function built therein according to an embodiment of the invention.

FIG. 4 is a block diagram showing a configuration of an IC card reader/writer having the electronic wallet function according to an embodiment of the invention. In FIG. 4, numeral 1104 designates a loading/unloading circuit, numeral 1105 a connector, numeral 1106 an IC card activation control circuit, numeral 1107 a clock generating circuit, numeral 1108 a reader/writer circuit, numeral 1109 a reader/writer control circuit, numeral 1110 a ROM, numeral 1111 a data waveform-shaping and extraction circuit, numeral 1112 an I/O port, numeral 1113 a main program ROM, numeral 1114 a RAM, numeral 1115 a CPU, numeral 1116 an IC card check data storage means, numeral 1117 an interface circuit according to the RS232C standard, and numeral 1118 a power generating circuit.

The embodiment of the invention shown in FIG. 4 is used by externally connecting a metal line or the like to various information equipment as described in FIG. 1. For this purpose, the embodiment includes an interface circuit of RS232C type. The body 110 of the IC card reader/writer 11 according to this embodiment of the invention includes an IC card insertion slot 111 for introducing the IC card 10 into the body of the IC card reader/writer 11, a loading/unloading circuit 1104 for driving the IC card 10, a connector 1105 for connecting the IC card 10, an activation control circuit 1106 for activating the IC card by supplying power and a clock signal to the IC card 10, a clock generating circuit 1107, a reader/writer circuit 1108 for reading data from and writing data into the IC card 10, a reader/writer control circuit 1109 for controlling the operation of the reader/writer 1108, a ROM 1110 for storing a program for controlling basic operation of the IC card based on the ISO standard by the CPU 1115, a data waveform-shaping and extraction circuit 1111 for shaping the waveform of the data read from the IC card 10 and extracting the data, an I/O port 1112 for inputting and outputting data between the reader/writer circuit 1108 and the CPU 1115, a ROM 1113 for storing a main electronic wallet processing program for processing the electronic money stored in the IC card 10 by the CPU 1115, the CPU 1115, an IC card check data storage means 1116 for storing the ID (identification) data for checking whether or not the information stored in the IC card 10 is electronic money information, an interface circuit 1117 based on the RS232C standard for exchanging data between the IC card reader/writer body and the personal computer, and a power generating circuit 1118 for supplying each circuit with power through a connector based on the RS232C standard.

Now, assume that the IC card reader/writer 11 according to an embodiment of the invention is connected to other equipment such as a banking teller terminal 12 of a bank branch system or an existing POS terminal 22, and that the IC card 10 is inserted into the IC card insertion slot 111 of the body 110 of the IC card reader/writer according to this embodiment. The loading/unloading circuit 1104 functions to load the IC card 10 automatically so that the connector 1105 and the contact means of the IC card 10 come into contact with each other. The CPU 1115 recognizes this contact and instructs the control circuit 1106 to activate the IC card 10 and supply power and clocks to the IC card.

The CPU 1115 subsequently reads the ID data representing the information type from the IC card 10 through the connector 1105 and the reader/writer 1108. These operations are performed according to the ISO standard using the program stored in the ROM 1110. The program stored in the ROM 1110 is used for exchanging the formats of the data input to or output from an IC card in a manner to conform with the protocol of the IC card, steps of activating the IC card, and steps of reading data from and writing data into the IC card.

The CPU 1115 compares the ID data read from the IC card 10 with the data stored in the IC card check data storage means 1116 and checks to see whether the IC card 10 contains the electronic money information. Upon confirmation that the IC card 10 contains the electronic money information, the main electronic wallet processing program for the IC card reader/writer 11 according to the embodiment of the invention stored in the ROM 1113 becomes ready for execution.

The above-mentioned operation is performed automatically by the IC card reader/writer 11 regardless of the operation of the other devices connected thereto.

The other devices connected to the IC card reader/writer 11 issue a request to the IC card reader/writer 11 for accessing the IC card 10 through the RS232C interface 1117. In response to this request, the IC card reader/writer 11 sends out the ID data previously read from the IC card 10 to the personal computer 32. Also, in the case where the electronic money information is stored in the IC card 10, the fact is notified to the other devices.

Figure 5:
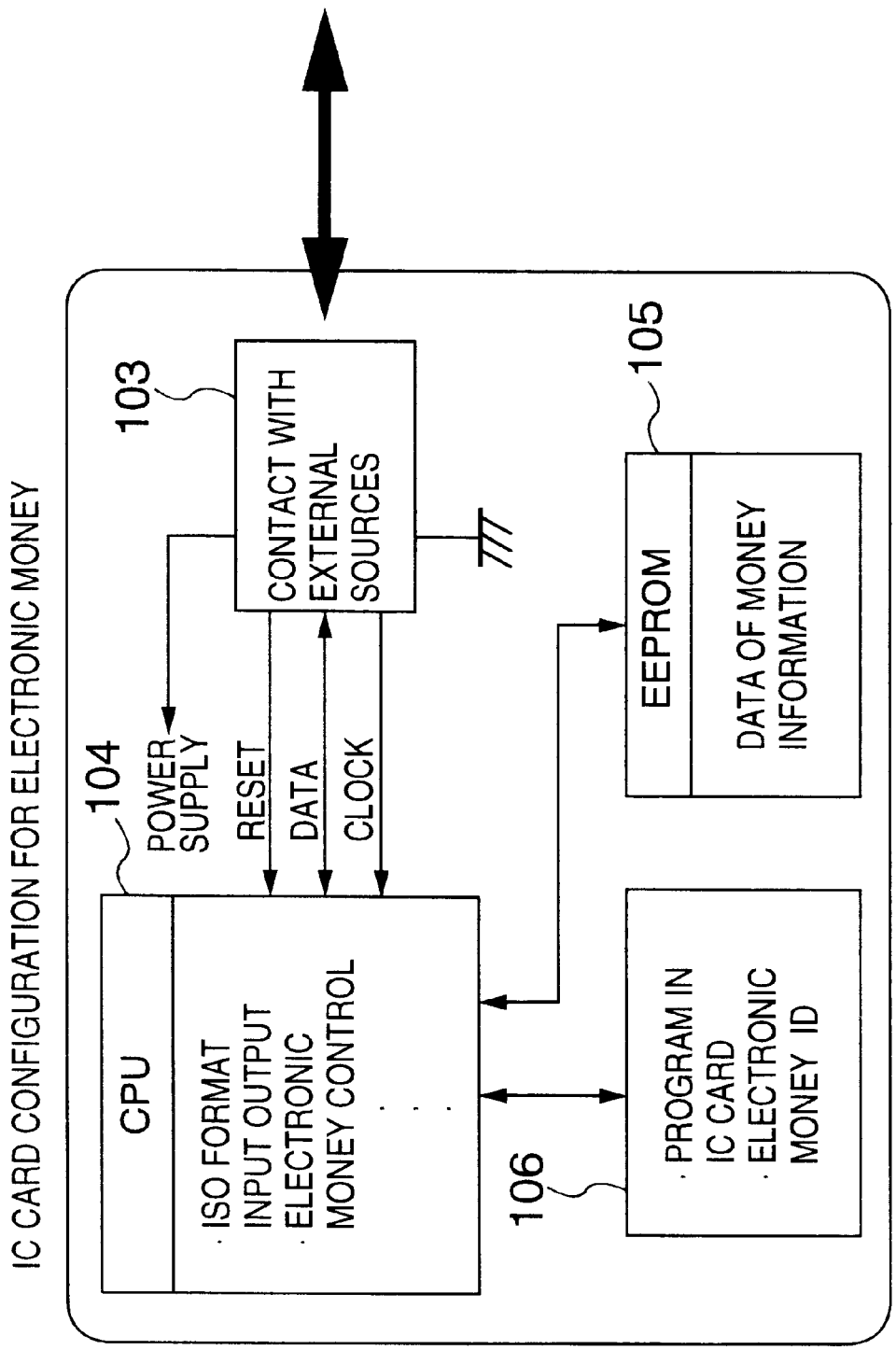
FIG. 5 is a block diagram showing an example of a specific configuration of an IC card having the electronic wallet function.

FIG. 5 is a block diagram showing an example of a specific configuration of the IC card 10 used as an electronic wallet. This electronic wallet IC card 10 will be explained. In FIG. 5, numeral 103 designates an external contact means, numeral 104 a CPU, numeral 105 an EEPROM and numeral 106 a ROM.

The IC card 10 storing the electronic money for the electronic wallet includes a contact means 103 for exchanging various signals including power, clocks and reset signal with external sources, a CPU 104 for controlling the operation of the IC card 10, a ROM 106 for storing a program for the CPU 104, and a memory such as a rewritable EEPROM 105 for holding the data on electronic money or the like.

In the above-mentioned configuration, the CPU 104 performs such processes as controlling a protocol for data input and output according to the ISO standard, and encryption according to the program for electronic wallet stored in the ROM 106. The amount information, the purchase record and other information used for the electronic wallet are stored in the EEPROM 105.

The basic operation as an electronic wallet of the IC card reader/writer according to the present embodiment of the invention configured as described above is performed by accessing the electronic money in the IC card in accordance with the main electronic wallet program in the ROM 1113 included in the body 110 of the IC card reader/writer 11.

The advantage of this configuration lies in that the safety against the illegal operation or illegal access from outside can be eliminated by containing exclusively in the IC card reader/writer the function of accessing the electronic money information in the IC card 10 rather than by attaching such function, as in common practice, to devices easily accessible to a program source such as those connected to the IC card reader/writer according to this invention. The program installed in such devices as the banking teller terminal 12, the existing POS terminal 22 or the personal computer 32 connected to the IC card reader/writer according to an embodiment of the invention, therefore, is limited to the functions of supplying the IC card reader/writer 11 with such auxiliary information as money destination and the transferred amount of money.

Figure 6:
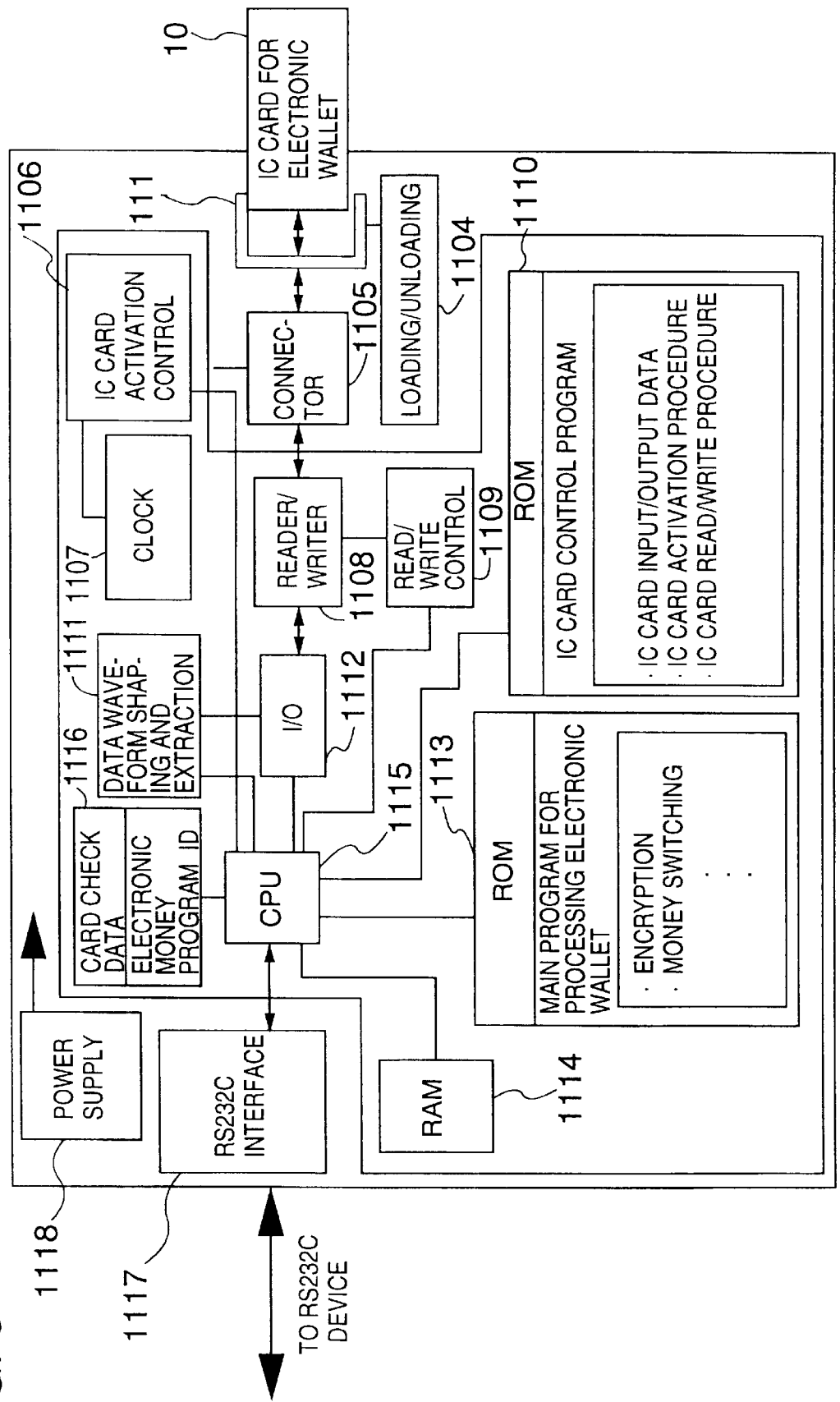
FIG. 6 is a block diagram showing a configuration of an IC card reader/writer having an electronic wallet function built therein according to another embodiment of the invention.

FIG. 6 is a block diagram showing a configuration of an IC card reader/writer of RS232C type having an electronic wallet function built in it according to another embodiment of the invention. This IC card reader/writer has the same function as the IC card reader/writer of RS233C type shown in FIG. 4. The reference numerals in FIG. 6, therefore, designate the same component parts as the corresponding parts in FIG. 4, respectively.

The RS232C-type IC card reader/writer shown in FIG. 6 has an exclusive device for exclusively containing the function of accessing the electronic money information in the IC card and thereby further enhances the safety against illegal access or illegal operation from external sources.

Specifically, the embodiment shown in FIG. 6 represents a one-chip control LSI configured as an integrated single chip having the electronic wallet function, including a control circuit 1106 for activating the IC card 10 by supplying the IC card 10 with power and clocks, a clock generating circuit 1107, a reader/writer circuit 1108 for reading data from or writing data into the IC card 10, a reader/writer control circuit 1109 for controlling the operation of the reader/writer 1108, a ROM 1110 for storing a program for enabling the CPU 1115 to control the basic operation of the IC card according to the ISO standard, a data waveform shaping and extraction circuit 1111 for extracting and shaping the waveform of the data read from the IC card 10, an I/O port 1112 for inputting/outputting data between the reader/writer circuit 1108 and the CPU 1115, a ROM 1113 for storing a main program for the electronic wallet for enabling the CPU 1115 to process the electronic money stored in the IC card 10, a RAM 1114 used by the CPU 1115 for data processing, an IC card check data storage means 1116 for storing ID data for checking whether or not the information stored in the IC card 10 is electronic money information, and the CPU 1115.

The embodiment shown in FIG. 6 further improves the safety against illegal accesses and illegal operation from external sources. The one-chip LSI may of course include other circuits such as an RS232 interface circuit.

In the case where the IC card reader/writer includes a keyboard such as ten-keys 113 and function keys 114 and a display section 115 as a functional configuration according to an embodiment of the invention as described above, the CPU 1115 is connected to the keyboard and a display driver, which in turn is connected to the display section 115.

Apart from the two different appearances of the IC card reader/writer described above with reference to FIGS. 2 and 3 as embodiments of the invention, the apparatus according to the invention can assume various other shapes as described below.

Figure 7:
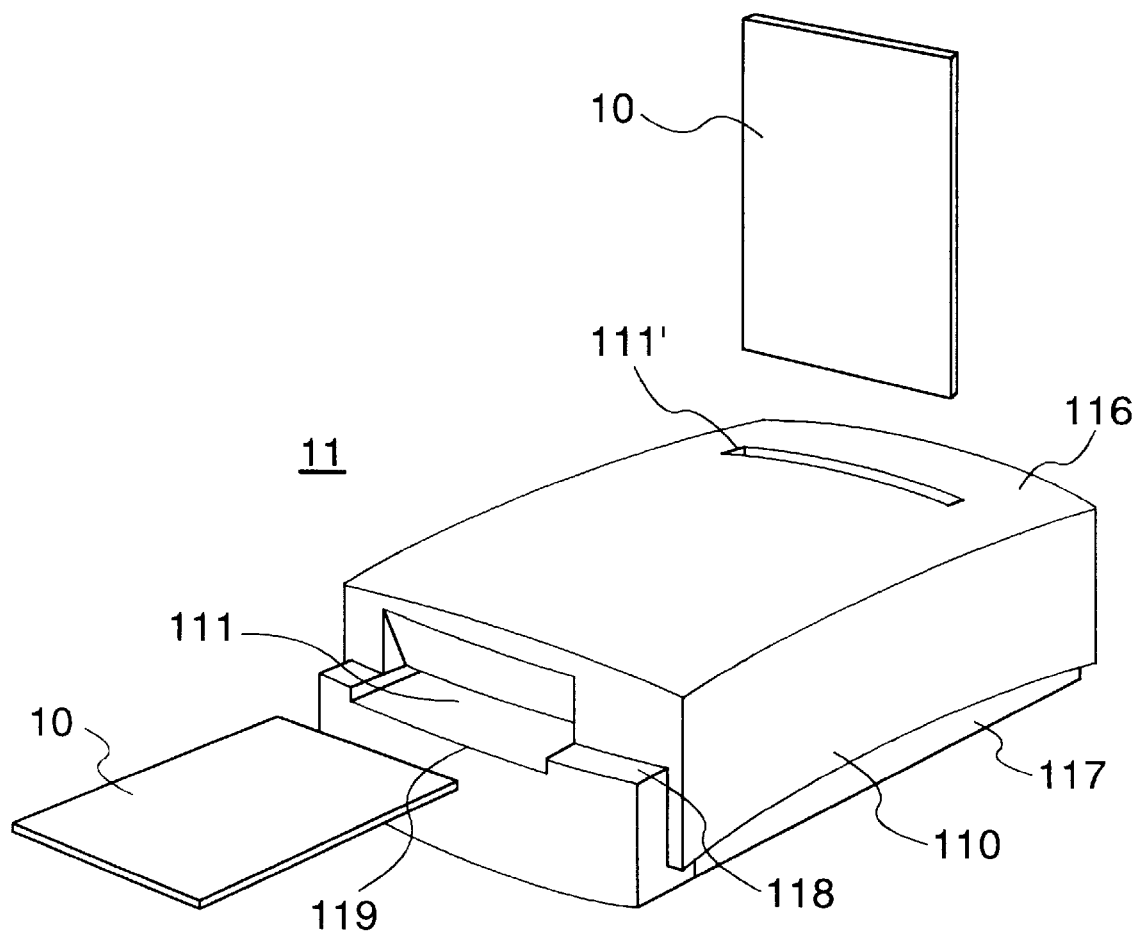
FIG. 7 is a perspective view showing an external appearance of an IC card reader/writer according to still another embodiment of the invention.
Figure 8:
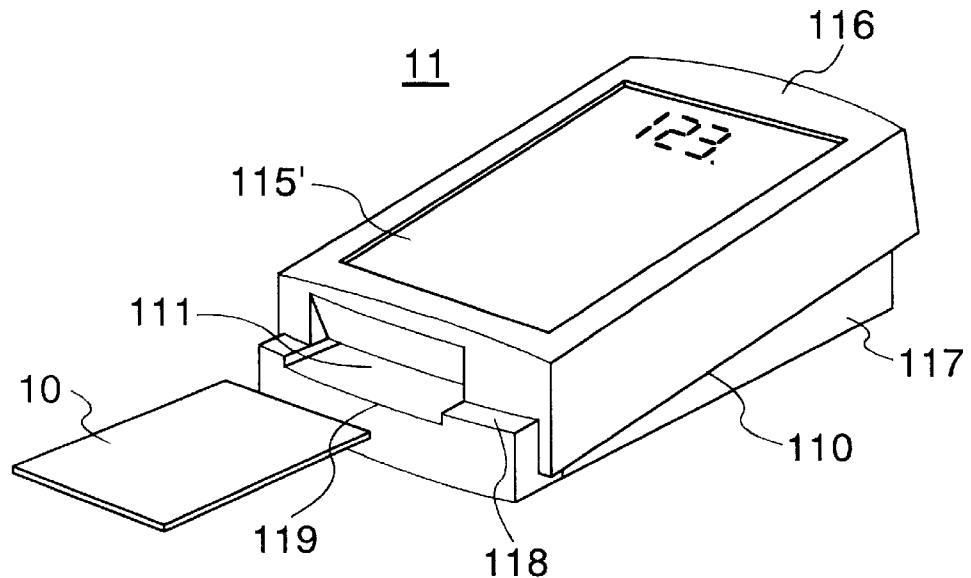
FIG. 8 is a perspective view showing an external appearance of an IC card reader/writer according to a further embodiment of the invention.
Figure 9:
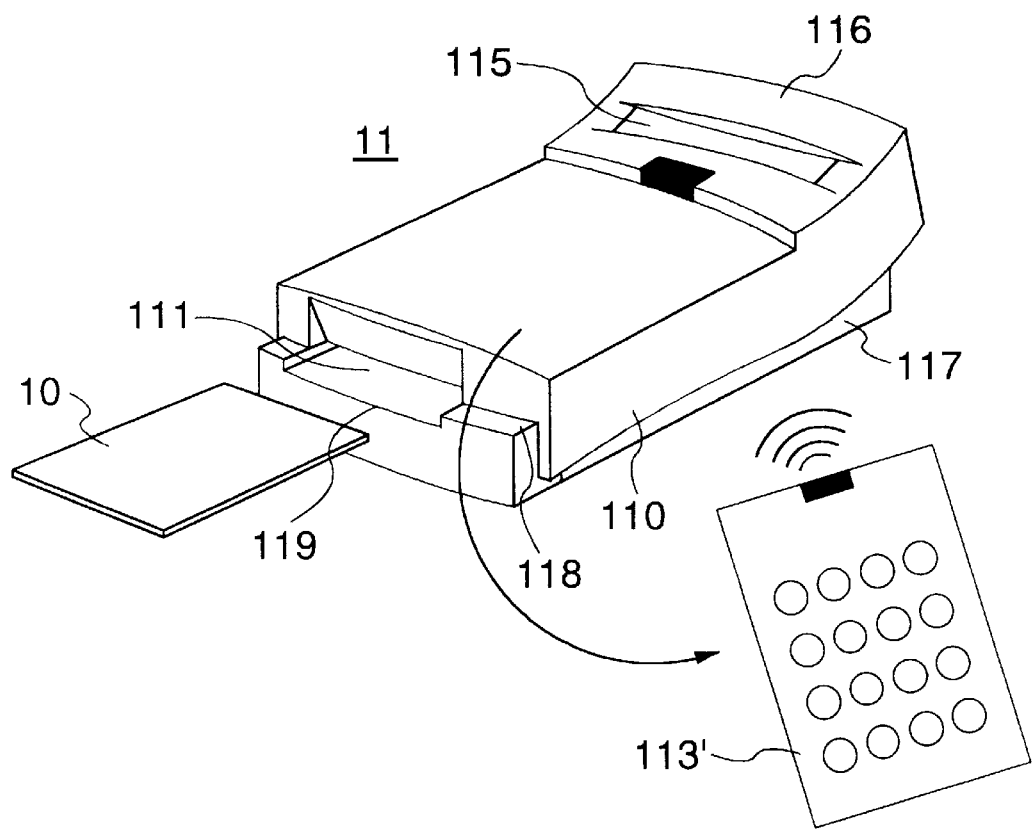
FIG. 9 is a perspective view showing an external appearance of an IC card reader/writer according to a still further embodiment of the invention.

FIGS. 7 to 9 are perspective views showing an IC card reader/writer according to other embodiments of the invention.

The IC card reader/writer shown in FIG. 7, as compared with the one shown in FIG. 2, includes a second IC card insertion slot 111' formed in the upper surface of the upper cover 6 of the body 110. Each one of the two IC card insertion slots 111, 111' may be used independently or in combination with the other by inserting two IC cards into them. For example, one IC card 10 can be used for transactions by electronic money, and the other IC card 10 for electronically recording household expenses. In the case where each of the IC cards inserted into the reader/writer shown in FIG. 7 are used independently, on the other hand, electronic money can be transferred between the two IC cards.

The second IC card insertion slot 111' formed in the upper surface of the upper cover 6 of the body 110 in the above-mentioned case may alternatively be formed in one of the sides of the upper cover 116 of the body 110 for the same use as in the preceding case.

The IC card reader/writer shown in FIG. 8 includes a display section 115' composed of a liquid crystal element over the whole upper surface of the upper cover 116 of the body 110. Soft ten-keys and soft function keys as well as information are displayed on this display section 115' as a touch panel. This configuration makes the IC card reader/writer easier to use.

The IC card reader/writer shown in FIG. 9 includes a keyboard 113' having the ten-keys 113 and the function keys 114 shown in FIG. 3 removably mounted on the body 110. In the case where the IC card reader/writer is used with the keyboard 113' removed, the keyboard 113' and the body 110 can be connected to each other by infrared rays or radio wave. The user holding the keyboard 113' in his hand can enter his password or the like for unlocking the IC card 10 invisibly to other persons.

In the case where transactions are performed between IC cards containing electronic money, the IC card reader/writer according to the above-mentioned embodiments of the invention can be used suitably for interfacing the IC cards with various conventional devices such as a personal computer, a telephone, a POS terminal, information or communication equipment and for processing data in the IC cards.

Also, since the IC card insertion slot 111 is formed with a rack, the IC card can be inserted easily and accurately without any fear of dropping. Further, an optically-handicapped person attempting to insert an IC card can accurately insert it simply by touching the IC card insertion slot by his hand and thus identifying the rack.

Furthermore, the IC card reader/writer according to an embodiment of the invention has the body including the upper cover and the lower portion separable from each other. By separating the upper cover from the lower portion, therefore, the maintenance work on the functional circuits and the like encased in the body can be easily carried out. Also, the information on display is easily visible from the insertion slot side of the IC card reader/writer in view of the configuration thereof in which the surface of the upper cover is curved upward in such a shape as to increase the thickness of the IC card reader/writer progressively toward the portion thereof far from the IC card insertion slot.

Figure 10:
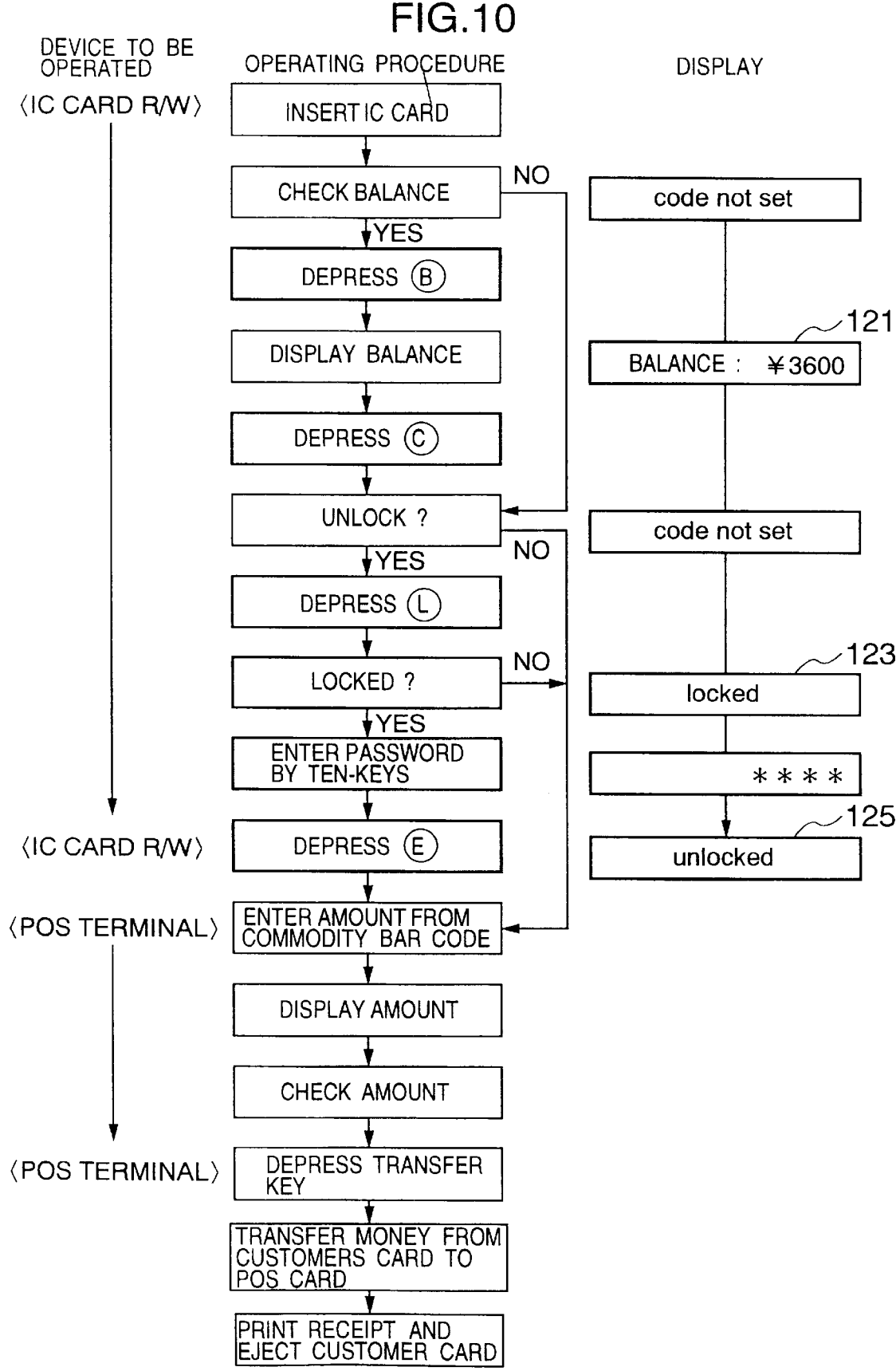
FIG. 10 is a diagram showing the steps of operating an IC card reader/writer according to an embodiment of the invention.
Figure 11:
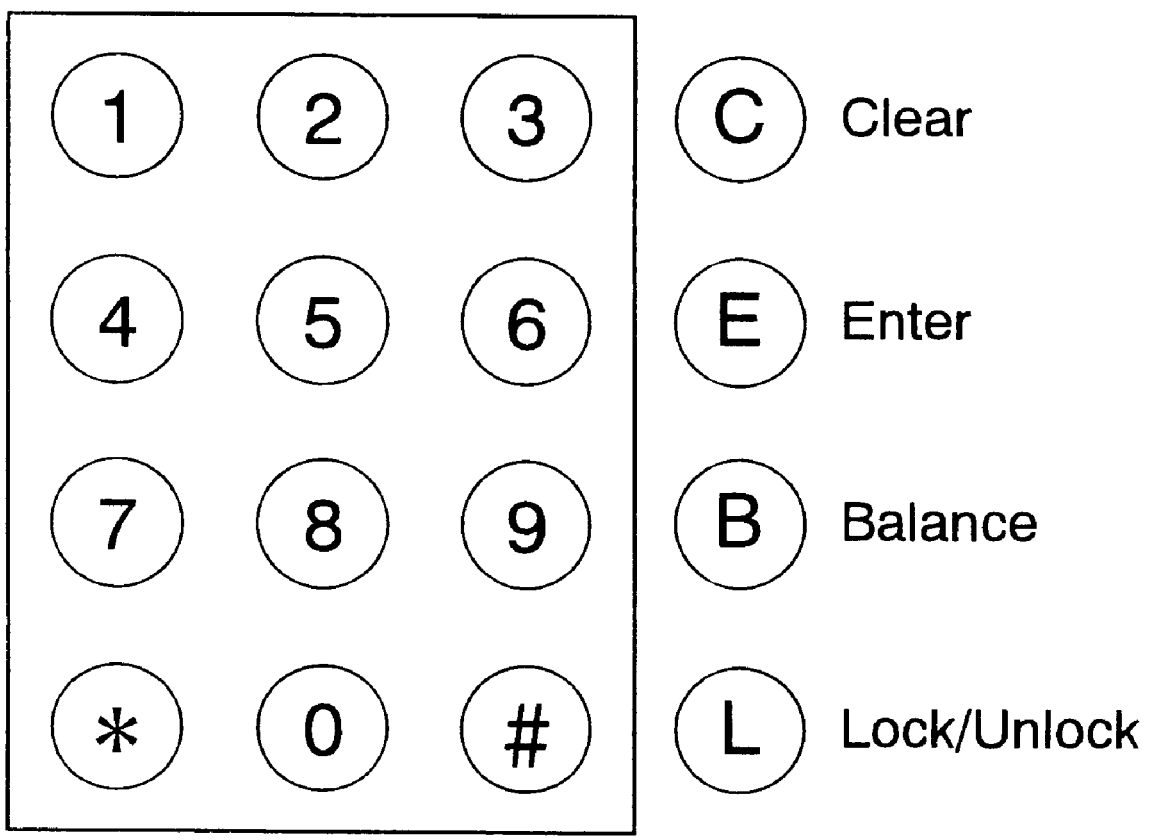
FIG. 11 is a diagram showing an arrangement of keys for operating an IC card reader/writer according to an embodiment of the invention.

Steps of operating the IC card reader/writer according to an embodiment of the invention will be described with reference to FIG. 10. FIG. 10 shows an example of steps of operating and the contents of display on the display section of an IC card reader/writer having the operating keys shown in FIGS. 3, 8 or 9 and connected to a POS terminal for transferring electronic money. FIG. 11 shows an example of the arrangement of the operating keys of the IC card reader/writer. This card reader/writer has ten-keys on the left side and function keys on the right side. The function key C indicates a CLEAR button for erasing the information on display or cancelling an entry. The key E is an ENTER button indicating confirmation or execution. The key B is a BALANCE button used for checking the balance or an outstanding amount. The key L is a LOCK/UNLOCK button used for confirming the locked state of the IC card or changing the state of the IC card.

First, the IC card 10 is inserted into the IC card insertion slot 111. When the balance is checked, the BALANCE button is depressed. The balance such as indicated by 121 appears on the display section 115 or 115'. In the case where it is desired to check the locked state of the IC card, the display of the balance is erased by depressing the CLEAR button followed by depressing the LOCK/UNLOCK button. In the case where the IC card is in locked state, a display such as indicated by 123 appears instructing a password to be entered. The password is entered by the ten-keys and the ENTER button is depressed. The password is then checked in the IC card reader/writer, and in the case where the entered password coincides with a corresponding password in registration, the IC card is unlocked such as indicated by 125. Then, the POS terminal is operated. Upon entry of the amount to be transferred from the bar code or the like of a commodity, the particular amount is displayed on the display section of the POS terminal. This amount can also be displayed on the display section 115 or 115' of the IC card reader/writer. The amount thus displayed is checked, and the ENTER button is depressed, for example. The electronic money is transferred from the customer's IC card, i.e., the IC card inserted in the IC card reader/writer to the IC card contained in the POS terminal. After that, a receipt is printed and the customer's IC card is delivered from the IC card reader/writer.

The above-mentioned function keys facilitate and simplify the operations of checking the balance and the locked state of an IC card.

Figure 12:
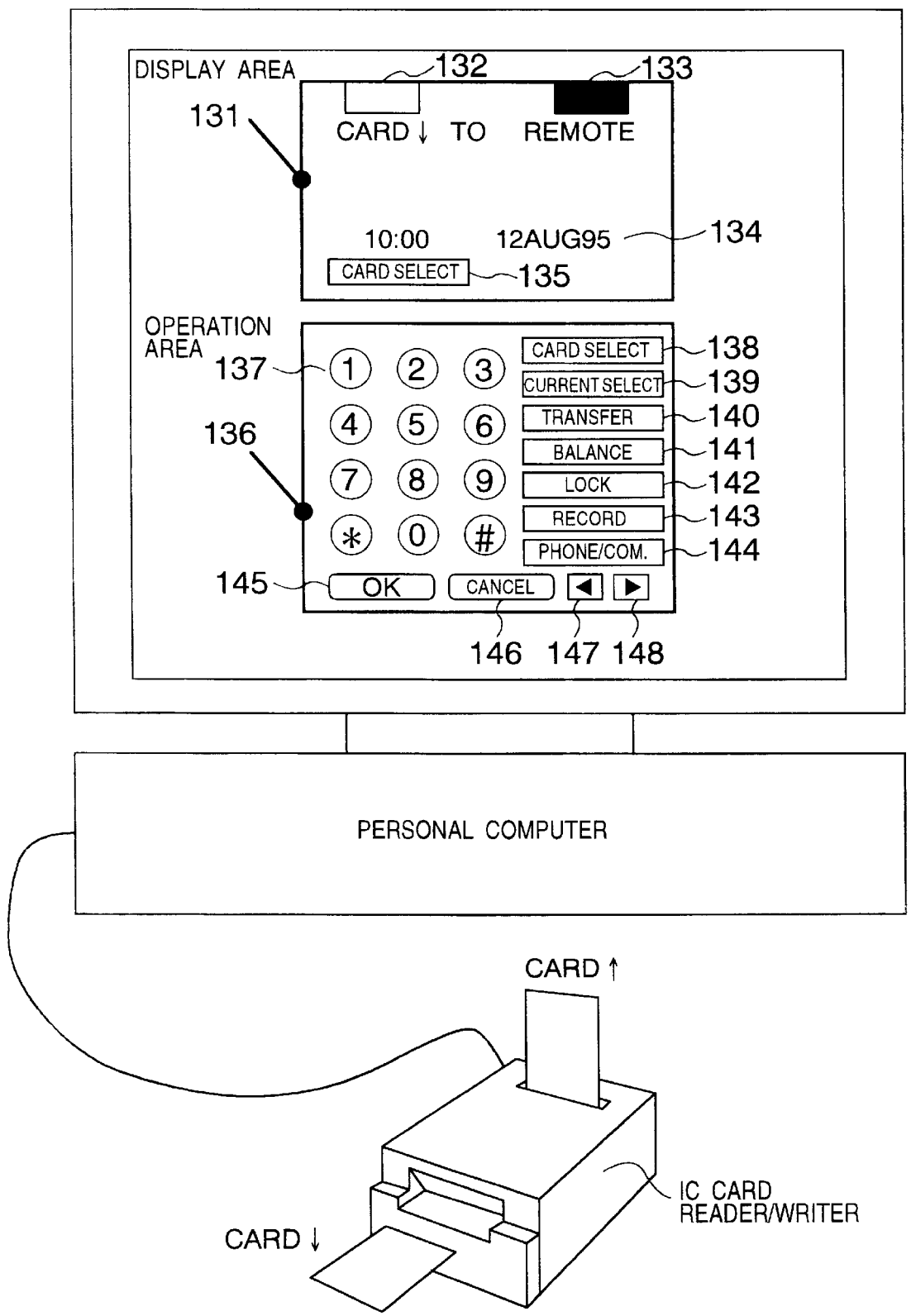
FIG. 12 is a diagram showing an example of a display screen of a personal computer connected with an IC card reader/writer according to an embodiment of the invention for displaying the operation of remitting electronic money, etc.

FIG. 12 shows an example of the display screen of a personal computer connected to the IC card reader/writer according to an embodiment of the invention for transferring or otherwise performing transactions by electronic money. Numeral 131 designates a display area on the display screen of the personal computer, numeral 132 an indication of the card of a remitter of electronic money, numeral 133 an indication of the card of a remittee, numeral 134 an indication of the present date and time, and numeral 135 an indication of the on-going step of operation. In the example of FIG. 12, the card-selecting operation is on display. The solid marking in the indication area 133 shows that the card of the remittee is selected. Numeral 136 designates an operation area displayed on the display screen of the personal computer. Numeral 137 designates ten-keys used for entering numerical values. Numeral 138 designates a CARD SELECT button used for selecting the card of the remitter or the remittee. Numeral 139 designates a CURRENCY SELECT button for selecting one of a plurality of currencies, if any, contained in the IC card. Numeral 140 designates a TRANSFER button used for transferring electronic money to another card. Numeral 141 designates a BALANCE button used for checking the balance of electronic money contained in the IC card. Numeral 142 designates a LOCK button used for checking whether or not the IC card is locked. Numeral 143 designates a RECORD button used for checking the past record, i.e., history of transactions using the electronic money contained in a particular IC card. Numeral 144 designates a PHONE/COM button used for communication with the other party through a public telephone line or the like. Numeral 145 designates an OK button for checking the display contents or instructing a displayed command to be executed. Numeral 146 designates a CANCEL button used for erasing the entered data or cancelling an operation. Numeral 147 designates a LEFT SHIFT button used for switching from the remittee's card to the remitter's card or moving the cursor for entering a numerical value. Numeral 148 designates a RIGHT SHIFT button used for switching from the remitter's card to the remittee's card or moving the cursor for entering a numerical value. As described above, the display area and operation area are formed on the display screen of the personal computer to permit the user to perform transactions by electronic money simply by referring to the two areas. Even those persons who are not accustomed to the operation of the personal computer, therefore, can easily operate it. Also, in view of the possibility of operation using the buttons displayed on the operation area, even those persons not accustomed to the keyboard operation can easily operate. The buttons displayed on the operation area may alternatively be clicked using a mouse, or operated by touching the display screen constituting a touch panel of the personal computer by finger or pen. Instead of displaying the display area and the operation area on the display screen of the personal computer as in the example described above, the same areas can be alternatively displayed on the liquid crystal display on the upper surface of the IC card reader/writer as shown in FIG. 8. As another alternative, the buttons included in the operation area may be arranged on the upper surface of the IC card reader/writer, and the data in the display area may be displayed on the display section on the upper surface of the IC card reader/writer. Further, in the case where the IC card reader/writer is connected to information equipment having a display section other than the personal computer, the display area and the operation area may be arranged on the display section of the particular information equipment.

FIGS. 13 to 17 show the steps of operating an IC card reader/writer according to an embodiment of the invention connected to a personal computer for transferring electronic money, switching the currency or checking the transaction record. Each operating step will be explained below with reference to FIG. 12.

Figure 13:
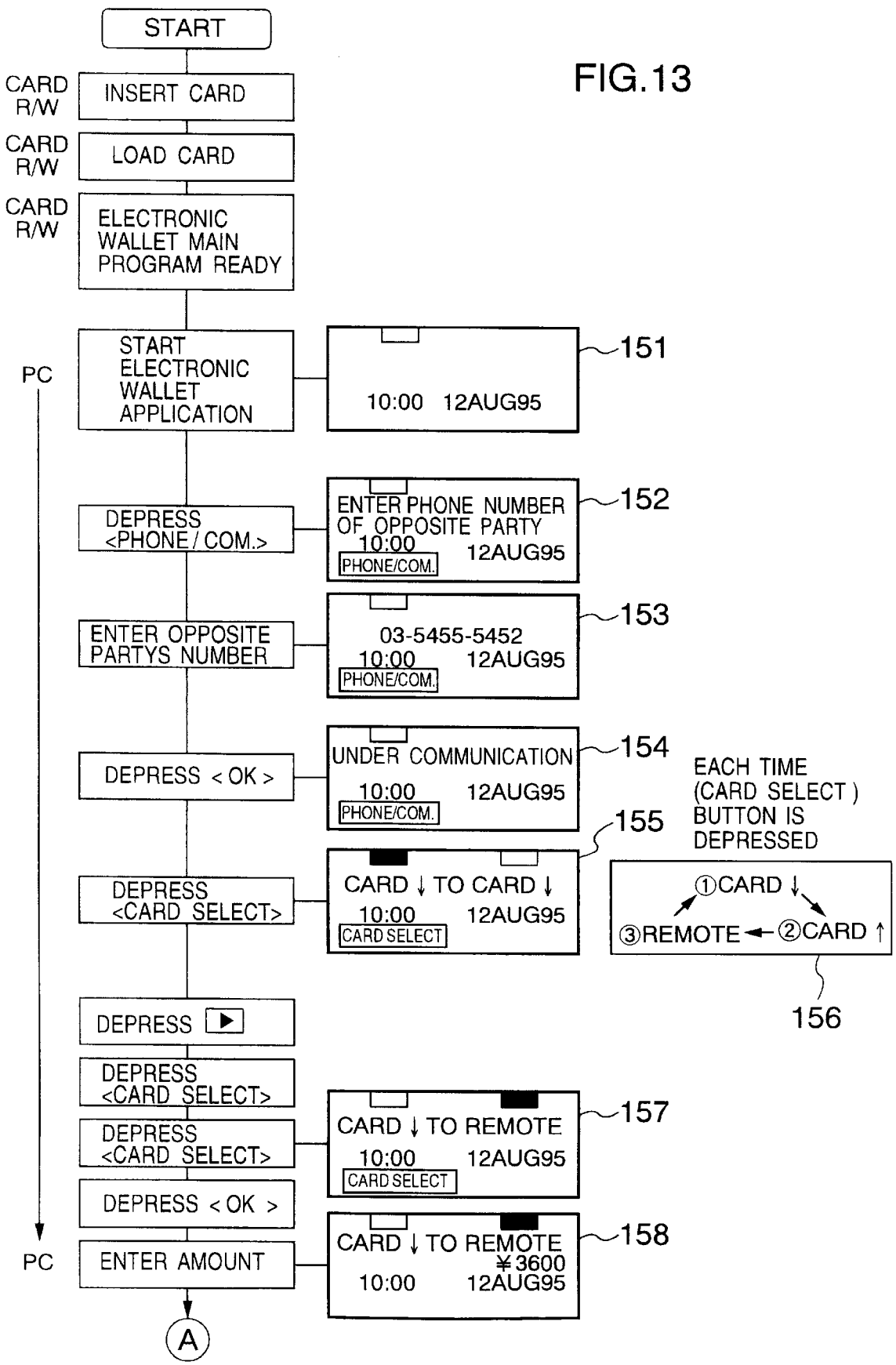
FIG. 13 is a diagram showing an example of the steps of operation and data displayed on the display screen in the case where an IC card reader/writer according to an embodiment of the invention is connected with a personal computer for transferring electronic money between IC cards connected through a public telephone line.
Figure 14:
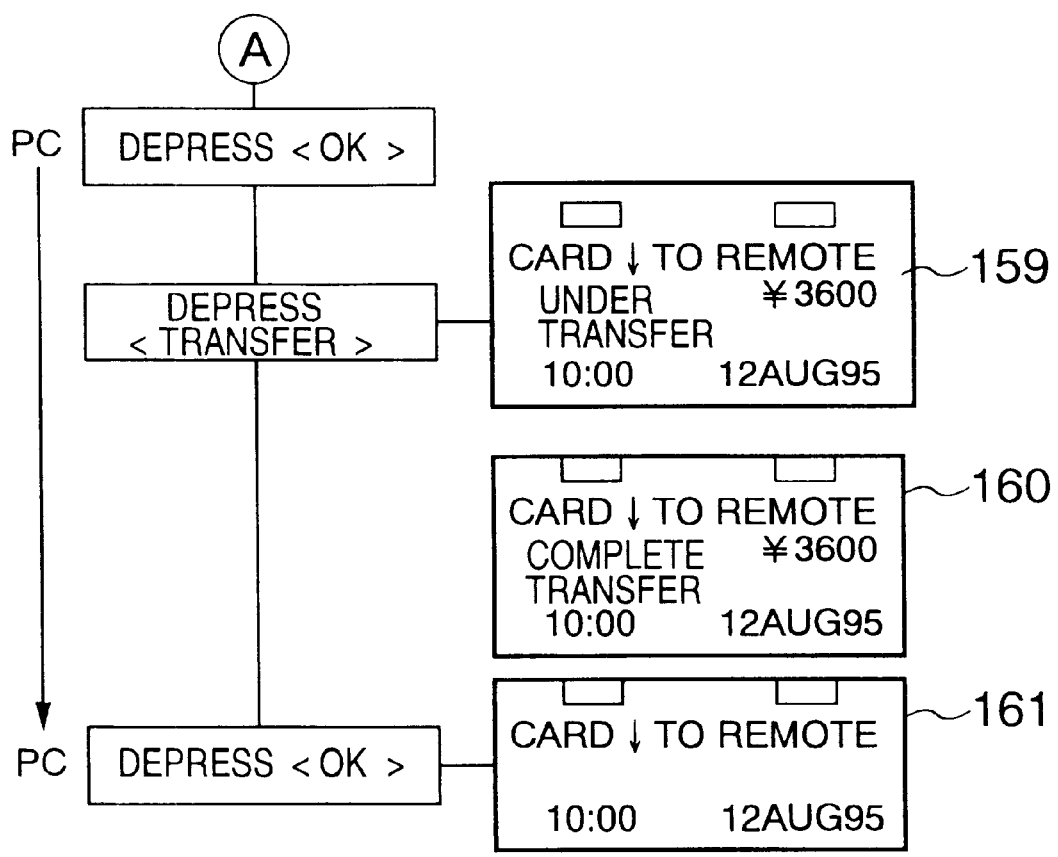
FIG. 14 is a diagram showing an example of the steps of operation and data displayed on the display screen in the case where an IC card reader/writer according to an embodiment of the invention is connected with a personal computer for transferring electronic money between IC cards connected through a public telephone line.

FIGS. 13 and 14 show an example of the steps of operating and contents displayed on an IC card reader/writer according to an embodiment of the invention connected to a personal computer for transferring electronic money between IC cards connected through a public telephone line. First, an IC card is inserted into the card insertion slot 111. The IC card reader/writer performs the card-loading operation so that the main program for processing an electronic wallet becomes ready for execution, thereby initiating the electronic wallet processing application of the personal computer. At the same time, the present date and time is displayed on the display area 131 as indicated by 151. Then, the PHONE/COM button 144 is depressed so that the data as indicated by 151 is displayed and an instruction is given to enter the telephone number of the other party or the like. Upon entry of the telephone number of the other party, the data entered is displayed in the display area as indicated by 153. The telephone number is checked and the OK button 145 is depressed. The communication thus starts with the other party. The remitter's card and the remittee's card are specified, and the CARD SELECT button 138 is depressed. The indication area 132 indicating the remitter's card changes in color, indicating that the remitter's card is selected. Each other press of the CARD SELECT button 138 sequentially changes the display of the remitter's card as indicated by 156. FIG. 13 shows the case in which an IC card reader/writer having two IC card insertion slots is connected to a personal computer. The card is inserted either from the lower insertion slot as indicated by CARD↓ or from the upper insertion slot as indicated by CARD↑. In the case of using an IC card reader/writer having only one card insertion slot, however, display of only one of the marks is sufficient. Even when an IC card reader/writer having two card insertion slots is used, only one card inserted can be displayed in the case where it is the only card inserted in the two insertion slots. The mark REMOTE indicates the card of the other party in communication. When the card inserted in the lower card insertion slot is selected as the remitter's card, display as indicated by 155 appears. Then, the remittee's card is selected. Upon depression of the right shift button 148, the indication area 133 indicating the remittee's card changes in color, thereby indicating that the remittee's card is selected. Under the state indicated by 155, the remittee's card is inserted into the lower card insertion slot. Two depressions of the CARD SELECT button 138 switches the remittee's card to REMOTE indicating the other party's card with the display appearing as indicated by 157. Depressing the OK button 145 completes the selection of the remitter's card by CARD and the other party's card by REMOTE. Using the ten-keys 137 or the like, the amount to be remitted is entered, and the data thus entered is displayed as indicated by 158. Explanation will be made with reference to FIG. 14. After the amount to be remitted is entered, the OK button 145 is depressed. The amount to be remitted thus is established. After that, the data displayed is checked, and the TRANSFER button 140 is depressed. A specified amount of money begins to be transferred from a specified remitter's card to a specified remittee's card, with the display appearing as indicated by 159. Upon complete transfer, the display as indicated by 160 appears. Depressing the OK button 145 changes the display as indicated by 161, making it possible to continue the remittance. These steps of operation include the checking by depressing the OK button each time a card is selected or a transaction amount is entered, and therefore an operating error can be prevented.

Figure 15:
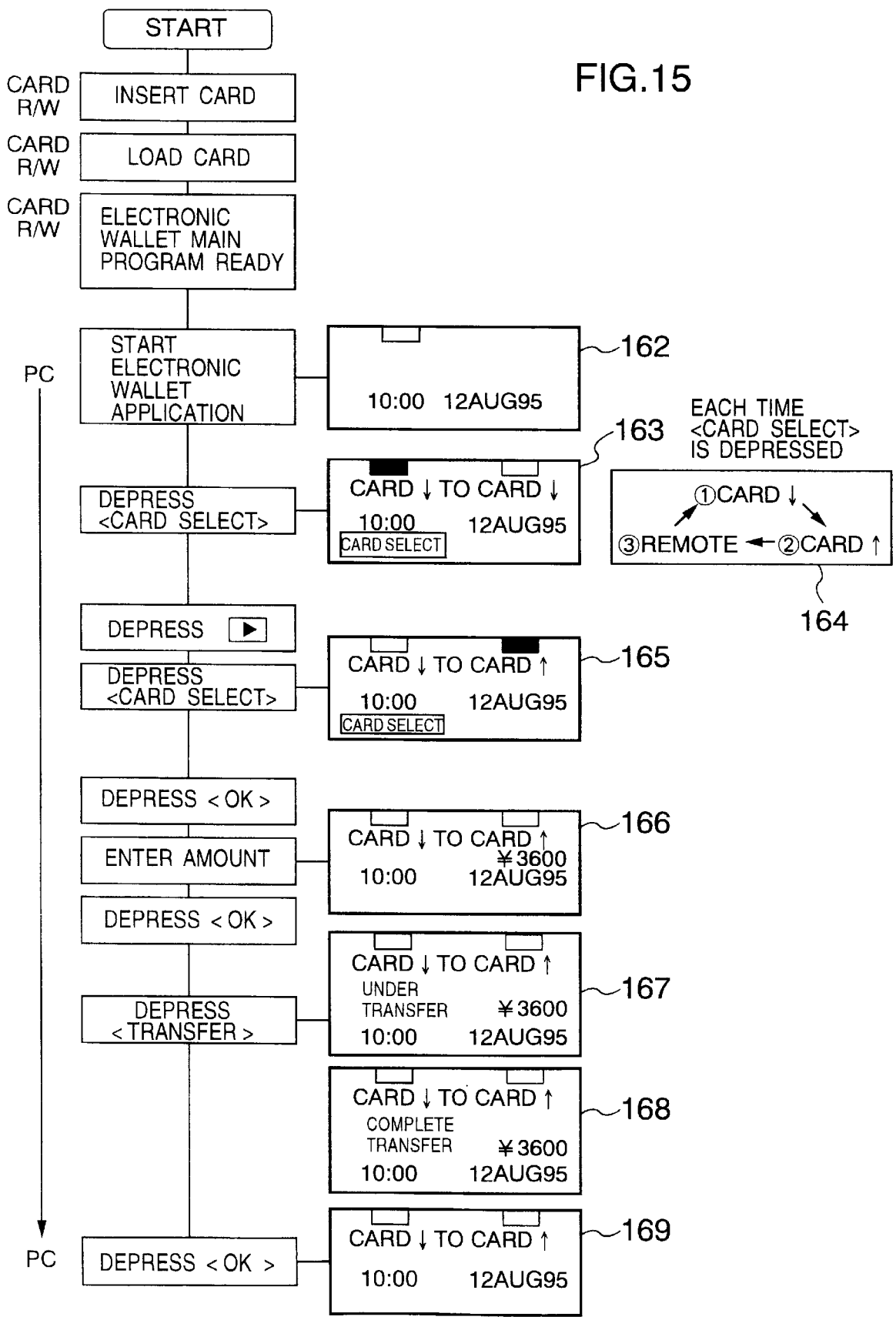
FIG. 15 is a diagram showing the steps of operation and data displayed on the display screen of an IC card reader having two IC card insertion slots for transferring electronic money between the two IC cards inserted into the insertion slots according to an embodiment of the invention.

FIG. 15 shows the steps of operation and data displayed on an IC card reader/writer having two card insertion slots according to an embodiment of the invention connected to a personal computer for transferring electronic money between the two cards inserted in the two insertion slots. Two IC cards are inserted into the two card insertion slots, respectively. The subsequent steps up to initiating the electronic wallet processing application of the personal computer are identical to those described above with reference to FIG. 13. The still subsequent operation is similar to those parts of the operating steps shown in FIGS. 13 and 14 after completion of connection for communication with the other party. In other words, the remitter's card and the remittee's card are selected, and the amount to be remitted is entered to execute transfer of electronic money, as described above. In the process, however, communication is not carried out with the other party, and therefore, REMOTE is not selected for the remitter's card or the remittee's card. In addition to the method of selecting a card by sequentially displaying the three marks CARD, CARD and REMOTE as shown by 164, therefore, a method is available in which CARD and CARD are displayed alternately for selecting a card in the absence of connection for communication with the other party. An IC card reader/writer, which has two card insertion slots in the above-mentioned examples, may alternatively have three or more card insertion slots, or a plurality of IC card readers/writers can be connected with a personal computer. In such a case, the remitter's card and the remittee's card are selected from a plurality of IC cards inserted into the IC card readers/writers, the transaction amount is entered, and the transfer processing is performed.

Figure 16:
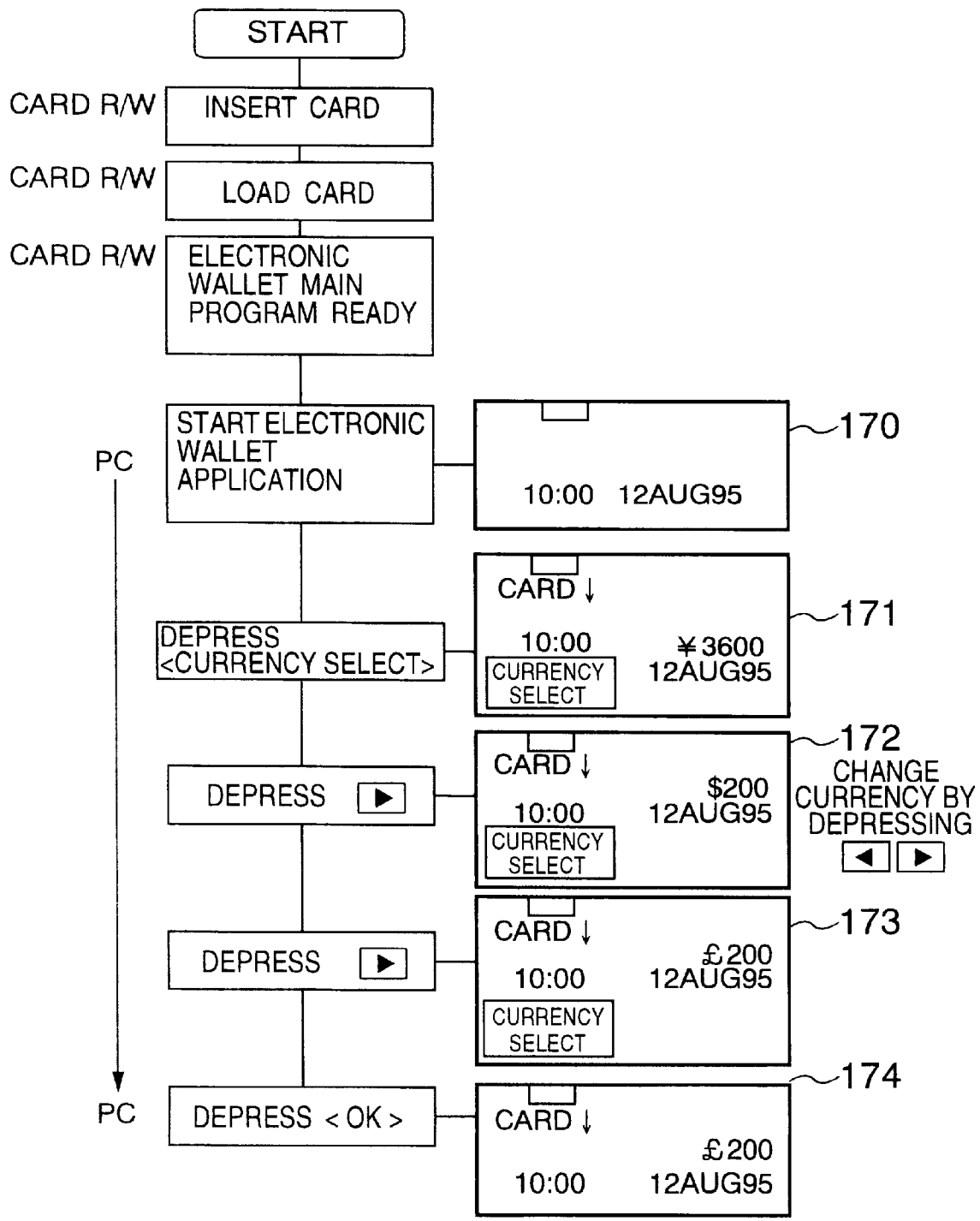
FIG. 16 is a diagram showing the steps of operation and data displayed on the display screen in the case where an IC card reader/writer according to an embodiment of the invention is connected with a personal computer for converting between a plurality of currencies which may be contained in an IC card.

FIG. 16 shows the steps of operation and data displayed for switching between a plurality of currencies contained in an IC card inserted in an IC card reader/writer according to an embodiment of the invention connected to a personal computer. The IC card can contain a plurality of currencies. In the case where transactions are desired by another currency than the one handled so far, the currency switch is required. The steps of operation from inserting the IC card into the card insertion slot up to initiating the electronic wallet processing application are identical to those in FIGS. 13 and 15. Depressing the CURRENCY SELECT button 139, the balance is displayed in the last-handled currency. In the example shown by 171, the currency is yen with the balance of ¥3,600. The RIGHT SHIFT button 148 is depressed, and the balance in another currency is displayed. In the example shown by 172, the currency is dollar and the balance is $200. Another press of the RIGHT SHIFT 148 displays the balance in still another currency. In the case shown by 173, the currency is pound and the balance is £200. In this way, the RIGHT SHIFT button 148 is depressed a given number of times until the balance in the desired currency comes to be displayed. When the desired currency is displayed, the OK button 145 is depressed. The currency switching thus is completed, and the display shown by 174 appears. In this way, the currency can be easily switched using the CURRENCY SELECT button and the RIGHT SHIFT button.

Figure 17:
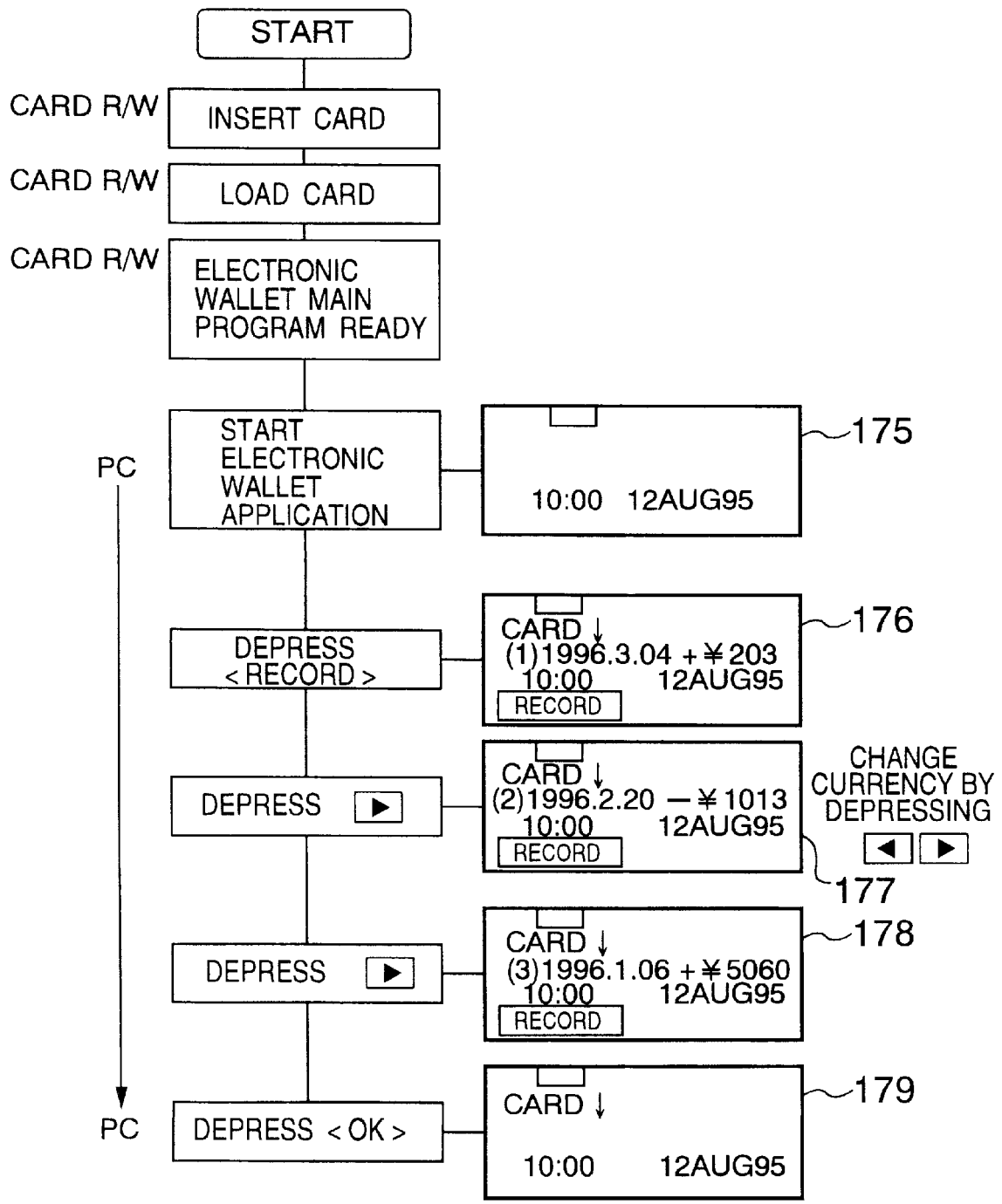
FIG. 17 is a diagram showing the steps of operation and data displayed on the display screen of an IC card reader/writer according to an embodiment of the invention for checking the transaction record of an IC card inserted therein.

FIG. 17 shows the steps of operation and data displayed for checking the history, i.e., the record of transactions that have been made using an IC card inserted in an IC card reader/writer according to an embodiment of the invention. The steps of operation from inserting the card up to initiating the electronic wallet application of the personal computer are similar to those shown in FIGS. 13, 15 and 16. Upon depression of the RECORD button 149, the display as shown by 176 appears. This data represents the date and amount of the last transaction. In the example shown by 176, the fact that the amount of ¥203 was received on Mar. 4, 1996. Then, the RIGHT SHIFT button 148 is depressed. The date and amount of the transaction immediately preceding to the last transaction displayed by 176 are displayed as indicated by 177. In the example shown by 177, it is indicated that the amount of ¥1,013 was received on Feb. 20, 1996. Still another depression of the RIGHT SHIFT button 148 causes the date and amount of the second preceding transaction to be displayed as shown by 178. The example shown by 178 indicates that the amount of ¥5,060 was received on Jan. 6, 1996. In this way, the past transactions can be checked by repetitive depressions of the RIGHT SHIFT button. As an alternative to the above-mentioned retroactive display of the history, i.e., the transaction record of an IC card, the transaction record may be displayed in the chronological order. Also, the amount covering a plurality of transactions can be displayed instead of the amount of only one transaction at a time. Further, the apparatus can be configured so that the user may designate the number of transactions of which the record can be displayed at a time. Also, unlike in the above-mentioned examples in which the date and amount of the transaction are displayed, other item(s) can be displayed additionally. Such other items may include transaction time, the other party and the object of transaction. The OK button 145 is depressed after checking the desired record. The record check operation thus is complete and the data as shown by 179 is displayed. As described above, the user can check the history of the IC card easily by the RECORD button and the shift buttons whenever desired.

According to this invention, as described above, an IC card reader/writer and a method of operation thereof are provided which are suitably used for interfacing between IC cards and various conventional equipment such as personal computers, telephone, POS terminals or information/communication systems and processing data in the IC cards in making transactions between the IC cards by electronic money.

The IC card can be inserted easily and accurately without fear of dropping. Also, an optically-handicapped person attempting to insert his IC card can insert it positively by touching the IC card insertion slot by hand and thus identifying the position of card insertion.

Further, according to the present invention, the maintenance of the functional circuits contained in the body can be easily carried out, and the data displayed are easily visible from the side of the apparatus where the IC card insertion slot is formed.

Furthermore, according to this invention, the function keys arranged in the operation area on the upper surface of the IC card reader/writer or on other information systems facilitates and simplifies the operations required for handling electronic money such as checking the balance and the locked state of the IC card.

We claim:

1. An IC card reader/writer used for interfacing between an IC card and other information systems, said IC card containing at least an integrated circuit capable of writing and reading digital information and electronic money, comprising:
   a body including at least one IC card insertion slot, said body including:
   an upper cover;
   a lower portion;
   least one step formed by displacement between said upper cover and said lower portion; and
   a recessed portion recessed from said step, said upper cover and said lower portion being separable from each other, said step being formed on a side of said body of the reader/writer formed with said IC card insertion slot.

2. An IC card reader/writer according to claim 1, wherein said IC card insertion slot is formed on at least one of an upper surface of said upper cover, a front surface of said body and side surfaces of said body.

3. An IC card reader/writer according to claim 1, wherein an upper surface of said upper cover is curved upwardly in a direction away from said IC card insertion slot in such a manner as to increase a thickness of said IC card reader/writer progressively toward the portion thereof far from said IC card insertion slot, and said upper cover has a display section located on the slope of said curved portion.

4. An IC card reader/writer according to claim 1, wherein said recessed portion guides said IC card into said insertion slot.

5. An IC card reader/writer used for interfacing between an IC card and other information systems, said IC card containing at least an integrated circuit capable of writing and reading digital information and electronic money, comprising:
   a keyboard having ten-keys and function keys arranged on an upper surface of said IC card reader/writer;
   a display section arranged on said upper surface of said IC card reader/writer;
   an IC card insertion slot arranged on said upper surface of said IC card reader/writer, said surface being closer to said keyboard section than said display section; and
   wherein said function keys include a key for checking whether or not said IC card containing electronic money is in a locked state.

6. An IC card reader/writer used for interfacing between an IC card and other information systems, said IC card containing at least an integrated circuit capable of writing and reading digital information and electronic money, comprising:
   a body including at least one IC card insertion slot, an upper cover, a lower portion, at least one step formed by displacement between said upper cover and said lower portion, a recessed portion recessed from said step, a keyboard including ten-keys and functions arranged on an upper surface of said upper cover, and a display section arranged on said upper surface of said upper cover, said upper cover and said lower portion being separable from each other, said step being formed on a side of said IC body formed with said IC card insertion slot, said function keys including key for displaying balance of the electronic money contained in said IC card and a key for checking whether or not the IC card containing the electronic money is locked.

7. An IC card reader/writer according to claim 6, wherein said ten-keys and function keys of said keyboard are soft keys displayed in a liquid crystal display area on said upper surface of said upper cover of said IC card reader/writer, and said display section is located in said liquid crystal display area and constitutes a touch panel.

8. An IC card reader/writer according to claim 6, wherein said keyboard having said ten-keys and said function keys is configured removably from said body, said keyboard being connected with said body by infrared light or radio wave in a case where said keyboard is used in a state removed from said body.

9. A method of operating an IC card reader/writer used for interfacing between an IC card and other information systems, said IC card containing at least an integrated circuit capable of writing and reading digital information and electronic money, said method comprising the steps of:

causing a user to insert an IC card into a card insertion slot of said IC card reader/writer;

causing the user to instruct whether or not said IC card is in a locked state to be displayed; and displaying whether or not said IC card is in a locked state.

10. A method of operating an IC card reader/writer according to claim 9, wherein whether or not said IC card is in A locked state is displayed using a specified one of the function keys arranged on an upper surface of said IC card reader/writer.

11. A method of operating an IC card reader/writer according to claim 9, further comprising the steps of:

instructing a password for unlocking said IC card to be entered in a case where said IC card is in a locked state; and causing the user to enter said password.

12. An IC card reader/writer used for interfacing between an IC card and other information systems, said IC card containing at least an integrated circuit capable of writing and reading digital information and electronic money, comprising:

an IC card insertion slot formed at a side face of a body of said IC card reader/writer;

a step formed at said side face where said insertion slot is formed;

a recessed portion recessed from said step and formed on said step;

a keyboard having ten-keys and function keys arranged on an upper surface of said body of said IC card reader/writer; and said function keys including a key for displaying a balance of electronic money contained in said IC card, and a key for checking whether or not said IC card containing the electronic money is in a locked state.

13. A method of operating an IC card reader/writer used for interfacing between an IC card and other information systems, said IC card containing at least an integrated circuit capable of writing and reading digital information and electronic money, comprising the steps of:

inserting an IC card into an insertion slot of said IC card reader/writer by a user;

instructing said IC card reader/writer to display a state as to whether or not said IC card is in a locked state by the user;

reading out electronic money information stored in said IC card by said IC card reader/writer and transferring said electronic money information to said other information systems from said IC card reader/writer; and displaying said state as to whether or not said IC card is in a locked state.

14. A method according to claim 13, further comprising a step of displaying said state as to whether or not said IC card is in a locked state by a display of said other information systems.

* * * * *